US 007964301B2

(12) United States Patent
Fischel et al.

(10) Patent No.: US 7,964,301 B2
(45) Date of Patent: Jun. 21, 2011

(54) DYNAMIC ACCELERATED REACTION BATTERIES UTILIZING TAYLOR VORTEX FLOWS

(75) Inventors: Halbert Fischel, Santa Barbara, CA (US); Philip Michael Lubin, Santa Barbara, CA (US); Daniel Timothy Lubin, Santa Barbara, CA (US)

(73) Assignee: Global Energy Science, LLC (California), Santa Barbara, CA (US)

( * ) Notice: Subject to any disclaimer, the term of this patent is extended or adjusted under 35 U.S.C. 154(b) by 0 days.

(21) Appl. No.: 12/800,709

(22) Filed: May 20, 2010

(65) Prior Publication Data
US 2010/0330460 A1 Dec. 30, 2010

Related U.S. Application Data

(60) Provisional application No. 61/220,583, filed on Jun. 26, 2009.

(51) Int. Cl.
*H01M 2/38* (2006.01)
(52) U.S. Cl. .............................. 429/69; 429/67; 429/68
(58) Field of Classification Search .................... 429/67, 429/68, 69
See application file for complete search history.

(56) References Cited

U.S. PATENT DOCUMENTS

| | | | |
|---|---|---|---|
| 5,139,894 A * | 8/1992 | Mizuno et al. ..................... 429/9 |
| 5,250,370 A * | 10/1993 | Faris ................................. 429/68 |
| 5,332,630 A * | 7/1994 | Hsu ................................. 429/432 |
| 5,824,278 A * | 10/1998 | Yao ................................. 423/263 |
| 5,830,593 A | 11/1998 | Nielson | |
| 6,319,293 B1 | 11/2001 | Debe et al. | |
| 6,471,392 B1 | 10/2002 | Holl | |
| 7,488,547 B1 | 2/2009 | Iacovelli | |
| 2002/0155330 A1* | 10/2002 | Tanaka ............................. 429/19 |
| 2002/0168556 A1* | 11/2002 | Leboe et al. ..................... 429/13 |
| 2005/0031517 A1* | 2/2005 | Chan ............................. 423/263 |
| 2006/0062702 A1 | 3/2006 | Hagemeister et al. | |
| 2007/0020142 A1 | 1/2007 | Federspiel et al. | |
| 2008/0149050 A1 | 6/2008 | Shih et al. | |

OTHER PUBLICATIONS

G.I. Taylor. Stability of a Viscous Liquid Contained between Two Rotating Cylinders, Philosophical Transactions of the Royal Society of London. Series A, Containing Papers of a Mathematical or Physical Character, vol. 223 (1923), pp. 289-343.*
D. V. Pugh, A. Dursun, and S.G. Corcoran. Formation of nanoporous platinum by selective dissolution of Cu from Cu0.75Pt0.25, J. Mater. Res. 2003, 18(1), 216-221.*
Gabe et al, The rotating cylinder electrode: a recent developement, Reviews of Applied Electrochemistry 6, J. of Applied Electrochemistry 13 (1983) pp. 3-22.
Gabe et al, The rotating cylinder electrode: its continued development and application, Reviews of Applied Electrochemistry 49, J. of Applied Electrochemistry 28 (1998) pp. 759-780.
Bagotsky, Fundamentals of Chemistry, Second Edition, John Wiley & Sons, Inc., Hoboken, NJ, USA, © 2006, §4.4—Convective Transport, pp. 60-67.

(Continued)

*Primary Examiner* — Jennifer K. Michener
*Assistant Examiner* — Carlos Barcena
(74) *Attorney, Agent, or Firm* — Sheldon L. Epstein; Malcolm J. Chrisholm, Jr.; Pamela J. Curbelo

(57) ABSTRACT

Dynamic accelerated reaction batteries (10, 100, 200) with rotating electrodes (14$x$, 20$x$, 104$x$, 106$x$,) or rotating membranes (208) or fuel cells (412C, 412D) that generate Taylor Vortex Flows (54, 122, 228, 454) and Circular Couette Flows (56, 124, 230) in electrolyte chambers (38$x$, 126$x$, 206, 438$x$) are disclosed.

45 Claims, 9 Drawing Sheets

OTHER PUBLICATIONS

Newman, Electrochemical Systems, Third Edition, John Wiley & Sons, Inc., Hoboken, NJ, USA, © 2004, Chapter 17—Convective-Transport Problems, §17.3-§17.8, pp. 382-399.

Newman, Electrochemical Systems, Third Edition, John Wiley & Sons, Inc., Hoboken, NJ, USA, © 2004, Chapter 1—Introduction, §1.4 Transport, pp. 8-18.

Bagotsky, Fundamentals of Chemistry, Second Edition, John Wiley & Sons, Inc., Hoboken, NJ, USA, © 2006, Preface to First Edition, pp. xix-xxi & §1.6 Classification of Electrodes and Electrode Reactions, pp. 12-15.

Newman, Electrochemical Systems, Third Edition, John Wiley & Sons, Inc., Hoboken, NJ, USA, © 2004, Preface to the First Edition, pp. xix-xx & §1.2 Thermodynamics and Potential, pp. 4-7.

Pletcher & Walsh, Industrial Electrochemistry, Chapman & Hall, London, UK, © 1982, Preface pp. viii-x; Chapter 7, §(d) pp. 346-350 & Chapter 11, p. 543.

* cited by examiner

US 7,964,301 B2

DYNAMIC ACCELERATED REACTION BATTERIES UTILIZING TAYLOR VORTEX FLOWS

CROSS-REFERENCE TO RELATED APPLICATIONS

This application claims the benefit of U.S. Provisional Application No. 61/220,583 filed 26 Jun. 2009 by Halbert P. Fischel, which is incorporated herein by reference.

This application, identified as Case E, is related to the following applications of Halbert P. Fischel:
- Case A: Electrochemical Cells Utilizing Taylor Vortex Flows, application Ser. No. 12/800,658, U.S. Publication Ser. No. 2010/0330439;
- Case B: Fuel Reformers Utilizing Taylor Vortex Flows, application Ser. No. 12/800,710, U.S. Publication Ser. No. 2010/0330445;
- Case C: Chemical Process Accelerator Systems Comprising Taylor Vortex Flows, application Ser. No. 12/800,657, U.S. Publication Ser. No. 2010/0329947; and
- Case D: Direct Reaction Fuel Cells Utilizing Taylor Vortex Flows, application Ser. No. 12/800,672, U.S. Publication Ser. No. 2010/0330459.

Case A, Case B, Case C, Case D and Case E (this case) were all filed on the same day. All of these applications have been assigned to the same assignee. The other applications are incorporated herein by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISK

Not Applicable

BACKGROUND OF INVENTION

1. Field of the Invention

This invention is in the field of electrochemical cells and batteries used to convert chemical energy into electrical energy and having means for providing relative motion between an electrode and an electrolyte—including means for rotating an electrode (U.S. Class 429/67-69, Int. Class H01M), to achieve accelerated chemical reaction rates promoted by Taylor Vortex Flows (TVF) and Circular Couette Flows (CCF).

2. Description of Related Art

Electrochemical cells and batteries (e.g., stacks, piles) have been studied for two-hundred years with objectives of increasing energy density (e.g. Joules/cm$^3$, Joules/kg), power density (e.g. Watts/cm$^3$, Watts/kg), charge-discharge rate (Amperes/second), terminal voltage, functional operating temperature range and the like. Most improvements in battery technology have been achieved by incremental advances in material selection and fabrication. While these improvements have been important, most of today's cells and batteries structurally resemble the Voltaic Pile of 1800 that comprised a stationary anode separated from a stationary cathode by an electrolyte.

Electrochemists have long understood that battery performance would be improved by causing electrolyte to flow between electrodes. The objectives were either to a) accelerate movement of ions between electrodes, b) prevent formation of metallic dendrites on electrodes that could short-circuit cells, and c) prevent or control flooding of electrodes by electrolytes. Some prior art cells or batteries included moving electrodes (e.g., U.S. Pat. No. 4,491,624 to Sarbacher et al, U.S. Pat. No. 4,521,498 to Tamminen and U.S. Pat. No. 4,684,585 to Tamminen) to induce electrolyte flows. However, there is no evidence that any of these cells or batteries is capable of discharging at a rate in excess of 1 ampere/cm$^2$ of electrode surface for an extended period.

SUMMARY OF THE INVENTION

Dynamic Accelerated Reaction Batteries (DARB) of this invention comprise one or more electrochemical cells capable of fast and high rates of discharge and, for secondary cells, fast and high rates of charge. These attributes are achieved by incorporating one or more rotating electrodes that induce Taylor Vortex Flows (TVF) and Circular Couette Flows (CCF) in electrolytes between anodes and cathodes. Electrodes optimized for use with TVF and CCF and having high current densities and consequent fast charge/discharge rates are described below.

Taylor Vortex Flows ("TVF"—also known as Taylor-Couette Flows) achieve enhanced reaction rates by a) accelerating electrode surface reaction mass-transport, b) capturing reaction products that can degrade electrode surfaces and electrolytes, c) eliminating those degrading reaction products from the cells, d) increasing operating temperature range to reduce overpotentials at electrodes and raise reaction rates and e) concentrate reacting electrode surface area exposure to electrolyte. Chemical and electrochemical cells—including fuel cells and fuel reformers—utilizing these achievements are described in Case A, Case B and Case D.

TVF can occur when a viscous fluid (e.g., electrolyte) is confined in a chamber or gap between two cylinders where one cylinder is rotating with respect to the other. For low differential angular velocities, in terms of circumferential Reynolds number, $R_c$, the flows are steady, purely azimuthal and known as Circular Couette Flows (CCF).

Battery electrodes described here use TVF that automatically generate accelerated, high-shear-rate, stable laminar CCF at the electrode surfaces. These laminar flows increase electrode surface electrical current density by accelerating mass transport of ions and providing means for removing degrading reaction products. Reactive electrodes used in batteries that present high surface area/projected area ratios to electrolytes are described in Case C and below.

In 1923, Sir Geoffrey Ingram Taylor published a groundbreaking paper on stability of the Couette flow. He reported that when the differential velocity, between the opposing cylinder surfaces forming a gap, is increased to a range within observed minimum and maximum speeds, Couette flow becomes unstable. Then, a secondary steady-state is created that is characterized by contra-rotating, axisymmetric, toroidal vortices with unique properties. This secondary steady-state is known as TVF.

Mechanical systems generating TVF are well known in the prior art of particulate filtration. For example, the following U.S. patents, hereby incorporated herein by reference, describe systems employing TVF for filtering blood without clogging a plasmapheresis membrane filter:

| # | Date | Title | Inventor |
|---|---|---|---|
| 4,755,300 | July 1988 | Couette Membrane Filtration Apparatus . . . | Fischel, R et al. |
| 4,808,307 | February 1989 | Couette Membrane Filtration Apparatus . . . | Fischel, R et al |
| 4,919,817 | April 1990 | Blood Cell Washing Systems & Method | Schoendorfer et al |
| 5,034,135 | July 1991 | Blood Fractionation System & Method | Fischel, H. |
| 5,053,121 | October 1991 | Blood Cell Washing System & Methods | Schoendorfer et al |
| 5,194,145 | March 1993 | Method . . . For Separation of Matter . . . | Schoendorfer |
| 5,376,263 | December 1994 | Pump Control Apparatus . . . Rotating . . . | Fischel, H. |
| 5,464,534 | November 1995 | Blood Fractionation System & Method | Fischel, H. |
| 5,738,792 | April 1998 | Method For Separation of Matter . . . | Schoendorfer |
| 5,783,085 | July 1998 | Blood Fractionation Method | Fischel, H. |

Particulate filters are readily distinguished from batteries and cells because 1) the filters lack electrodes and 2) the direction of flow of reactant fluids is diametrically opposite to that of batteries and cells.

In particulate filters such as these blood filters, a fluid, such as blood, containing a suspended particulate, such as blood cells, is pumped through a gap between opposing cylinder walls. One wall, usually the outer, is solid while the other is porous. The porous wall usually incorporates filter media and rotates within the outer wall. Fluid penetrates the filter media on the inner wall where TVF-accelerated high-shear-rate laminar flow prevents particulates from entering and clogging the filter media pores. TVF trap the particulates and transport them to an exit from the gap to be purged from the system.

Batteries and cells of this invention comprise different structures and employ TVF in a different manner. For example, cells incorporate porous anode and cathode electrodes separated by electrolyte. In embodiments described below, the electrolyte penetrates each of the electrodes in reversible directions for charge/discharge cycles, respectively, by moving in cross flow through a gap between the electrodes.

This disclosure describes systems and methods for management of any type of fluid electrolyte in electrochemical cells and batteries. Cells and batteries of this invention have ionic conductivities that are orders of magnitude greater than prior art cells and batteries so that ionic transfer time between electrodes that have been a mass transport limitation of electrical-current-producing chemical reactions now are negligible.

For cells and batteries incorporating membranes (e.g., lithium cells using LISICON™ membranes to separate an organic anolyte from an aqueous catholyte, such as U.S. Pat. No. 5,525,442 to Shuster), the dominant limitation on ionic conductivity is the rate at which ions can migrate through the membrane. This rate can be increased by creating high-shear-rate laminar flow at the surfaces of the membrane. Laminar CCF are in direct contrast with the prior art that teaches that turbulent flow is beneficial in reducing dendrite formation and increasing electrode activity.

The prior art also teaches that in order to maintain laminar flow, fluid (e.g., electrolyte) velocities must be kept sufficiently low so that the critical turbulent Reynolds Number, Re (not $R_c$), is not exceeded. The present invention of this disclosure succeeds because its cells have electrolyte velocities that result in much higher circumferential Reynolds Numbers, $R_c$, and high laminar shear rates stabilized by generated TVF. Because a requirement for laminar flow can be achieved at much higher laminar shear rates using TVF, as taught here, cells and batteries of this invention achieve multiple orders of magnitude higher current densities than non-TVF laminar flow cells and batteries.

The controlling factor for laminar shear rates is the minimum value of the hydro-dynamically defined Taylor number, $T_c$, above which desirable energetic vortices are fully established within the electrolyte. Axial Poiseuille-type flow can be further imposed by virtue of recirculation. Also, there is a strong dependence of the critical $T_c$ on the strength of the latter flow by way of its characteristic axial-flow Reynolds number, $R_a$.

Furthermore, there is a requirement to maintain laminar flow at electrode surfaces while promoting TVF within the electrolyte. Care must be taken to restrict the circumferential Reynolds number, $R_c$, to non-turbulent values. A set of distinct variables define a particular range of permissible operating parameters. These variables include predetermined ranges of: 1) temperature, 2) kinematic viscosity of the fluids being employed, 3) respective rates of recirculation, 4) angular rotation speed, 5) surface characteristics of the electrodes and 6) physical dimensions of the cell.

Given appropriate operating parameters, neither gaseous reaction products nor particle precipitates of the redox reaction at the electrodes can penetrate the TVF. Only redox-product ions in solution can enter the electrolyte and cross rapidly to the opposite electrode, which is an important feature of electrochemical cells utilizing TVF in electrolyte.

The present invention is a robust electrochemical cell or battery for providing electrical energy containing a fluid electrolyte between relatively rotating, co-axial cylindrical electrodes that cause Taylor Vortex Flows (TVF) and Circular Couette Flows (CCF) within the electrolyte. Where a membrane is required for separation of incompatible electrolytes, TVF and CCF enhance ion transport through the membrane.

It is therefore a first object of the present invention to provide a robust battery utilizing TVF and CCF to provide greatly increased mass transport of ions within the electrolyte and between electrodes.

A second object of the present invention is to provide a robust battery utilizing TVF and CCF to utilize greatly increased active or exposed electrode areas for a given cell volume exposed to electrolytes.

A third object of the present invention is to provide a battery that does not require any membrane disposed between electrodes.

A fourth object of the present invention is to provide a battery that can utilize a membrane, as when required for separating incompatible electrolytes, without increasing internal cell resistance.

A fifth object of this invention is to provide a TVF-CCF battery that is mechanically and electrically compatible with fuel cells, such as TVF-CCF fuel cells of the types disclosed in Case A and Case D.

A sixth object of this invention is to provide DARB that create dynamic flows within electrolytes to induce exceptionally high rates of mass transport to and from several redox chemical reactions.

A seventh object of this invention is to provide DARB with low mass-transport-limiting and surface-limiting electrode characteristics and dynamic forced convective flow of electrolyte through electrodes that have very high surface area volumetric concentrations.

An eighth object of this invention is to provide DARB in synergistic combination with a fuel cell.

These and other objects of this invention are more fully set forth in the following description of a preferred embodiment of this invention.

BRIEF DESCRIPTIONS OF THE SEVERAL VIEWS OF THE DRAWINGS

Reaction Battery incorporating a Direct Reaction Fuel Cell.

DETAILED DESCRIPTION OF THE INVENTION

Dynamic Accelerated Reaction Battery

First Embodiment

Four Cell Stack

Figure 1A:
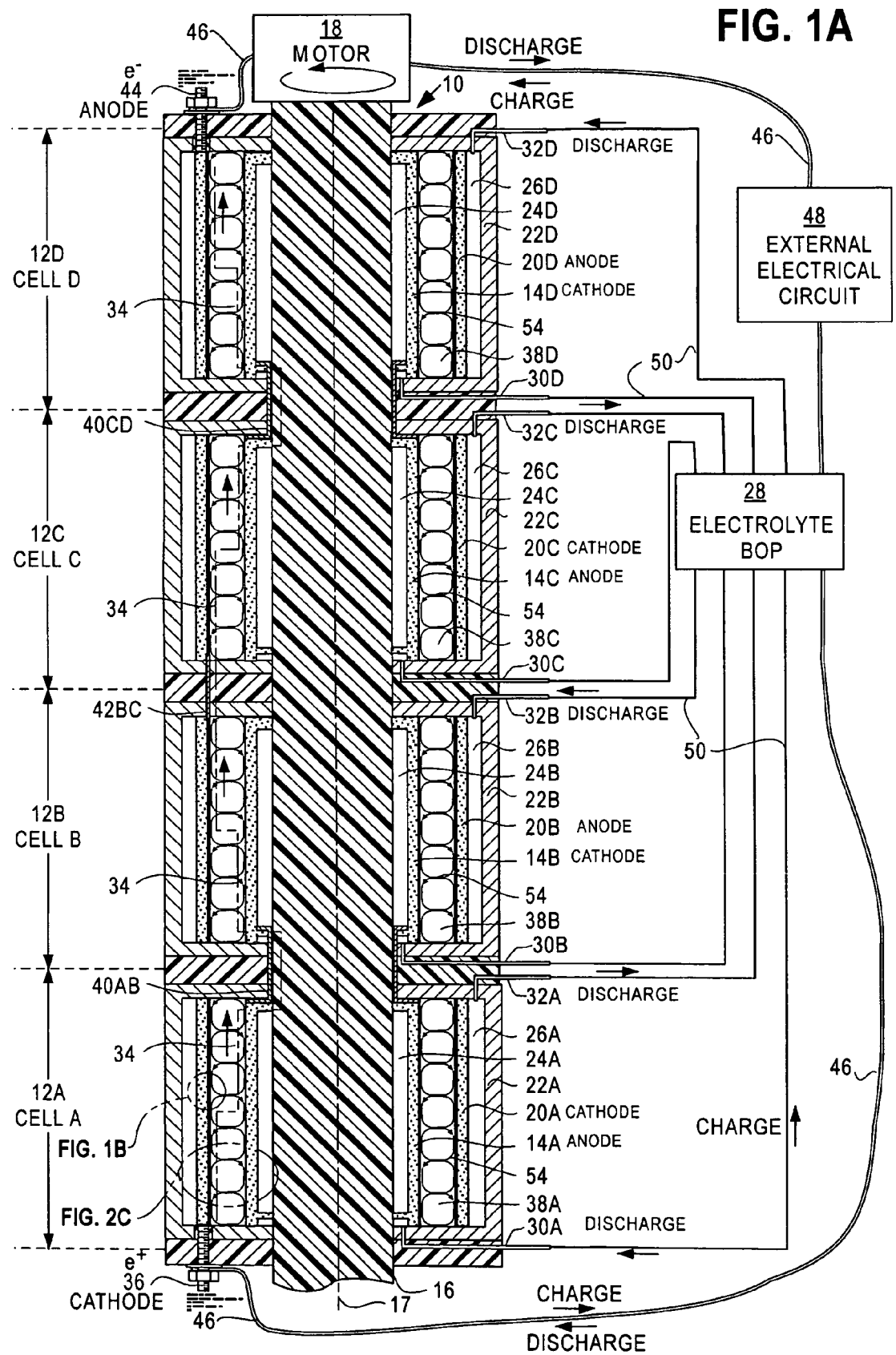
FIG. 1A is a fragmentary cross-sectional view of a first preferred embodiment of Dynamic Accelerated Reaction Batteries comprising a series of connected cells.

FIG. 1A is a fragmentary cross-section view of a Dynamic Accelerated Reaction Battery 10. FIG. 1A resembles FIG. 6 of Case D, which is a cross-section view of a TVF/CCF fuel cell. While the battery 10 and the fuel cell of Case D both convert their potential energies to electrical energy and share many similarities relating to TVF and CCF, they operate differently. DARB and most conventional batteries store potential energy in their electrodes or dual electrolytes while fuel cells store potential energy in their fuels. As a result, batteries and fuel cells have different energy densities, power densities, terminal voltages and currents.

The battery 10 comprises four cells CELL A-12A, CELL B-12B, CELL C-12C and CELL D-12D. Each cell contains a rotating electrode 14x where x stands for one of the letters A, B, C or D that is associated with one of the four cells 12x. The electrodes 14x are fixed to a shaft 16 that rotates about spin axis 17 and is driven by an electric motor 18. Each cell also contains a fixed electrode 20x that is secured to frame 22x. The motor 18 rotates so that so that there is relative motion between one electrode 14x, 20x of one polarity and another electrode 20x, 14x of another polarity. In this embodiment, the electrode 14A rotates within the electrode 20A, the electrode 14B rotates with the electrode 20B, the electrode 14C rotates with the electrode 20C and the electrode 14D rotates within the electrode 20D. Each frame 22x is mechanically coupled to and electrically insulated from adjacent frame(s) 22x.

Cylindrical electrodes 14x and 20x are shown in the drawings as right-circular and coaxial; however, these attributes are not a requirement and other cylinder-like geometries (e.g., elliptical, conical, hyperbolic, irregular, different axes) may be employed. Also, it is practical to build DARB 10 where the inner electrodes 14x are fixed and the outer electrodes 20x rotate or both electrodes 14x, 20x rotate at different speeds or directions. All that is required is that one of the cylinder-like electrodes 14x and 20x rotates relative to the other so that there is a relative, rotational velocity difference greater than zero between the cylindrical electrodes 14x and 20x.

Rotating electrodes 14A and 14C are anodes. Rotating electrodes 14B and 14D are cathodes. In this embodiment all of the electrodes 14x are fixed to and rotated by the shaft 16, which is common to all for rotating the electrodes 14x; however a common shaft is not a requirement. Fixed electrodes 20A and 20C are cathodes. Fixed electrodes 20B and 20D are anodes. In this embodiment, all of the electrodes 20x are fixed to their frames 22x, which are mechanically coupled together; however, that is not a requirement. As will be described, the cells 12x are connected in an electrical series circuit; but, parallel and combination circuits are also practical.

Each of the cells 12x has a rotating electrode manifold 24x and a fixed electrode manifold 26x. Each of the manifolds 24x and 26x is connected to electrolyte Balance of Plant (BOP) 28 through first and second electrolyte ducts 30x and 32x so that during discharge electrolyte can flow through anode electrodes 14A, 20B, 14 C and 20D through electrolyte chambers 38X and back to BOP 28 through electrodes 20A, 14B, 20C and 14D. The electrodes 14x are rotated by the motor 18 so that there is relative motion between one electrode of one polarity and another electrode of another polarity as well as relative motion of the electrodes 14x with respect to the electrolyte.

An electric circuit—illustrated in part as dashed line 34—is then formed that starts at battery cathode $e^+$ terminal 36 that is electrically connected to fixed electrode 20A. The circuit follows near circuit dashed line 34 up fixed electrode 20A, across electrolyte chamber 38A, up rotating electrode 14A to copper alloy sleeve busbar 40AB that provides a low-electrical-impedance connection between anode rotating electrode 14A and cathode rotating electrode 20B. The busbar 40AB is secured to and electrically insulated from the rotating shaft 16. The busbar 40AB is also insulated (not shown) from electrolyte in the chambers 38A and 38B to protect it from chemical attack.

The electric circuit continues up rotating electrode 14B, across electrolyte chamber 38B and up fixed anode electrode 20B to copper alloy busbar 42BC, which is secured to and insulated from frames 22B and 22C. The busbar 42BC provides a low-electrical-impedance connection between anode fixed electrode 20B and cathode fixed electrode 20C. The electric circuit continues up electrode 20C, across electrolyte chamber 38C to rotating anode electrode 14C and to busbar sleeve 40CD, which is essentially identical to busbar sleeve 40AB. The busbar sleeve 42CD provides a low-electricalimpedance connection between anode rotating electrode 14C and cathode rotating electrode 14D.

The electric circuit then continues up rotating cathode electrode 14D, across electrolyte chamber 38D and up to fixed anode electrode 20D to battery anode e⁻ terminal 44. The circuit is completed by electrical conductors 46 that connect the battery terminals 36 and 44 to external electrical circuit 48.

The arrows accompanying the electric circuit dashed line 34 show the direction of electricity in the electrodes 14$x$, 20$x$ for discharge. Only ions, not electrons, flow across the electrolyte chambers 38$x$, which may be modeled as voltage sources. The arrows marked DISCHARGE and CHARGE adjacent electrical conductors 46 show the direction of electric current flow for discharging and charging the battery 10. Similarly, the arrows marked DISCHARGE and CHARGE adjacent pipes 50 show the direction of electrolyte flow for discharging and charging the battery 10 through the first and second fuel ducts 30$x$, 32$x$ connected to the electrolyte chambers 38$x$.

FIG. 1A illustrates a four-cell battery in order to show the fixed busbar 42BC. However, the minimum number of cells required for the fuel cell battery 10 not requiring collector rings or brushes is only two. Where only two cells are used (e.g., 12A and 12B), then an anode terminal similar to anode terminal 44 can be used in place of the fixed busbar 42BC.

An important point worthy of emphasis is that this novel battery 10 does not contain any collector ring or brush. Thus, there is no need for 1) shaft seals or other mechanisms to protect a collector ring or brush from chemical attack, 2) additional cells or batteries connected in parallel to provide extra current to compensate for a current-limiting collector ring and brush, or 3) additional cell(s) connected in series to provide extra voltage to compensate for contact interface and I²R losses in a collector ring-carbon brush assembly. This collector brush-free fuel cell 10 battery configuration makes use of high-current batteries, such as the DARB 10 practical for powering high-energy external electrical circuits 48. Further, it can be built with as many cell pairs as needed to obtain a desired terminal 36-44 voltage.

Secondary DARB 10 of FIG. 1A can have two operational modes; namely, charge mode at higher than rated voltage and discharge mode at rated voltage or less; both modes being at the same polarity. From an operational perspective, the differences between these two modes are in a) the direction of current in the electric circuit 34, 46 and b) the direction of electrolyte flow in the electrodes 14$x$ and 20$x$.

The battery 10 is operated by electrically energizing motor 18 to rotate the shaft 16 and energizing Electrolyte BOP 28 to pump electrolyte. As shown for the embodiment of FIG. 1A, both the motor 18 and the Electrolyte BOP 28 are in a series circuit containing the battery 10, the electrical conductors 46 and the External Electrical Circuit 48. This circuit will provide feedback so that the speed of motor 18 and the flow rate of electrolyte pumped by BOP 28 will be a function of the magnitude and direction electric current flowing in conductors 46. Alternatively, either or both the motor 18 and the Electrolyte BOP 28 can be powered from an external source.

In a battery 10 discharge cycle, the electrolyte flow—as shown by labeled arrows in FIG. 1A—travels the following path:

Starting at the Electrolyte BOP 28;
Then, through electrolyte ducts 30$a$, 32$b$, 30$c$, 32$d$;
Then, into anode manifolds 24$a$, 26$b$, 24$c$, 26$d$,
Then, through the anode electrodes 14$a$, 20$b$, 14$c$, 20$d$;
Then, into electrolyte chambers 38$a$, 38$b$, 38$c$, 38$d$;
Then, through cathode electrodes 20$a$, 14$b$, 20$c$, 14$d$;
Then, into cathode manifolds 26$a$, 24$b$, 26$c$, 26$d$;
Then, through electrolyte ducts 32$a$, 30$b$, 32$c$, 30$d$; and
Then, back to electrolyte BOP 28.

In a battery 10 charge cycle, the direction of electrolyte flow is reversed.

Figure 1B:
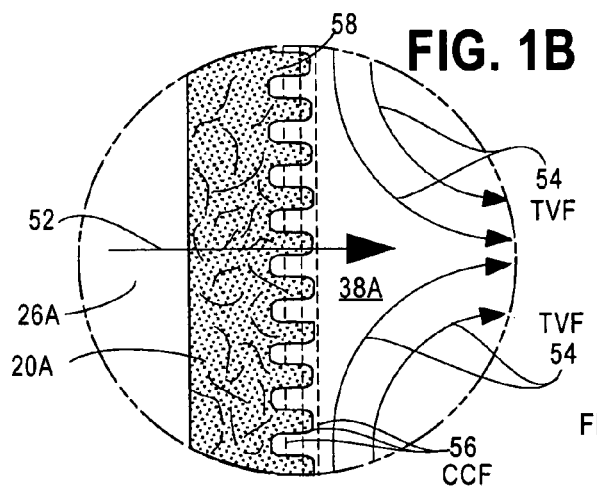
FIG. 1B is a magnified view of a portion of FIG. 1A showing a portion of one of the battery's electrodes.

As shown in FIG. 1B, the fixed electrode 20A is located between the fixed electrode manifold 26A and the electrolyte chamber 38A. Because of pump pressure from the electrolyte BOP 28, electrolyte flows from the manifold 26A to the chamber 38A, as shown by an arrow 52 in FIG. 1B. The rotation at a proper speed of the electrode 14A (not shown in FIG. 1B) relative to the fixed or stationary electrode 20A will cause TVF 54 to form in the electrolyte chamber 38A. When the speed of rotation is properly adjusted, then CCF 56 will form adjacent to the surfaces of both electrodes 20A and 14A.

The surfaces of the electrodes 20A and 14A may include protuberances 58 that extend into the CCF 56; but, not into the TVF 54. The limiting factor for charge and discharge rate or current of the battery 10 is its internal impedance for an applied voltage which is somewhat higher for charging than its normally rated discharge potential. Internal impedance is a function of transfer rate of anode ions (e.g., Li+) and not electrons in the electrodes 14$x$ and 20$x$, which are flooded with electrolyte. The CCF 56 are high-velocity, high-shear rate laminar flows that provide a dynamic improvement in ionic mass transport within electrolyte and expedite high-speed ion transport between the electrodes 14$x$ and 20$x$. The protuberances 58 also provide a great increase in exposed electrode surface area.

Taylor Vortex Flows and Circular Couette Flows

FIG. 2A, FIG. 2B, FIG. 2C and FIG. 2D are more detailed and somewhat idealized illustrations of Taylor Vortex Flows (TVF) 54 and Circular Couette Flows (CCF) 56 between one set of facing active surfaces—such as battery 10 electrode surface layers 14$x$ and 20$x$. The vortex flows 54 resemble doughnuts or, more technically, tori of fluid that spin around their own axes 60. These tori spin axes 60 define planes that are perpendicular to the cross-section view plane of FIG. 2C. The vortex radii 62 extend from the cell's shaft spin axis 17 to the center 64 of electrolyte chamber 24 between the respective fixed and spinning surface layers 20$x$ and 14$x$.

Figure 2A:
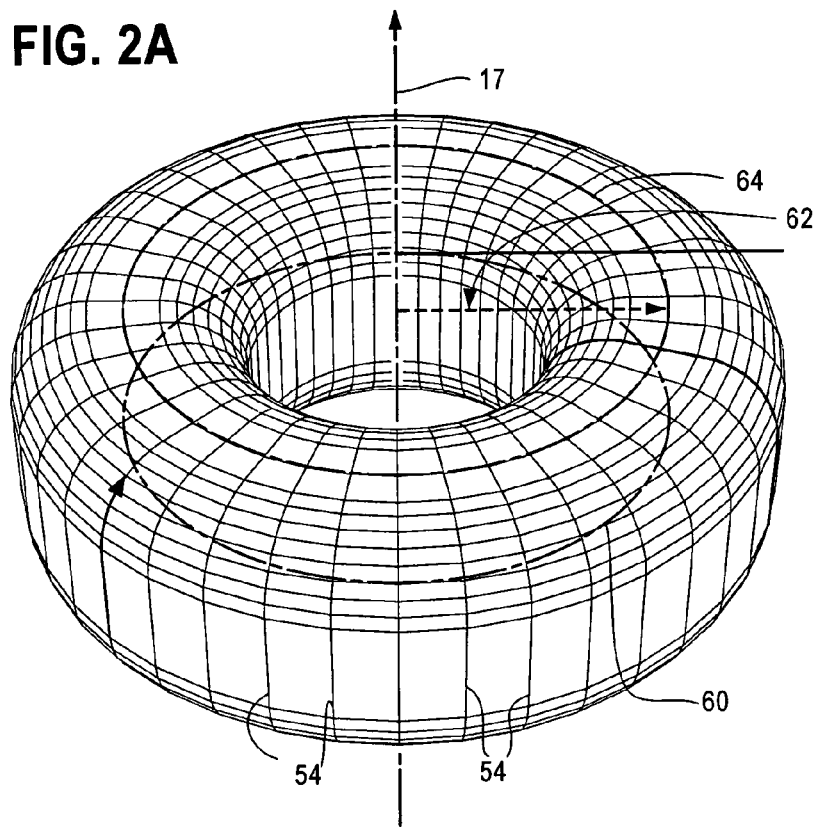
FIG. 2A, FIG. 2B, FIG. 2C and FIG. 2D are detailed illustrations of a Taylor Vortex Flows and Circular Couette Flows in Dynamic Accelerated Reaction Battery.
Figure 2B:
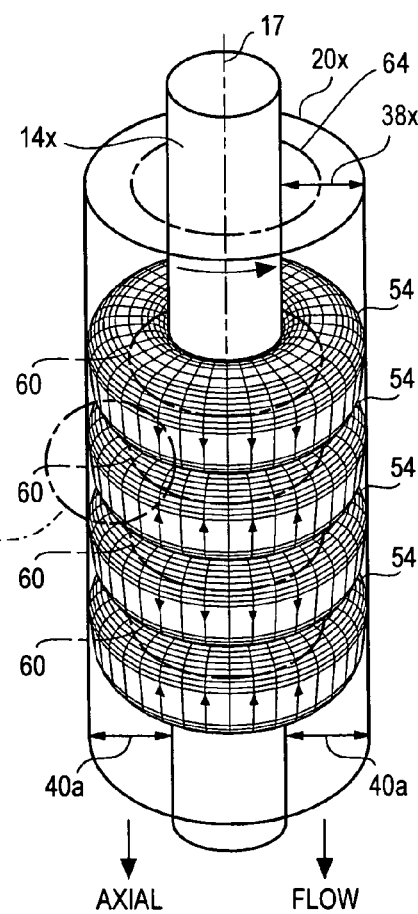

As shown in FIG. 2B, several vortex flows 54 form an array that extends along the full axial length of the electrolyte chamber 38$x$. Each vortex 54 is contra-rotating with respect to its adjacent vortex 54. Diameters of vortexes 54 are slightly less than the width of the electrolyte chamber 38$x$.

Of critical importance to the invention is the fact that the entire array of vortices 54 is enveloped by the high-shear-rate Circular Couette laminar flow boundary layer 56 (FIG. 2C) 56 of spinning fluid almost fully covering each of the adjacent electrode 14$x$, 20$x$ surfaces that enclose the array of vortices 54. Thin layers of fluid are moving with high laminar shear in a direction that is perpendicular to the sectional plane of FIG. 2C.

Figure 2C:
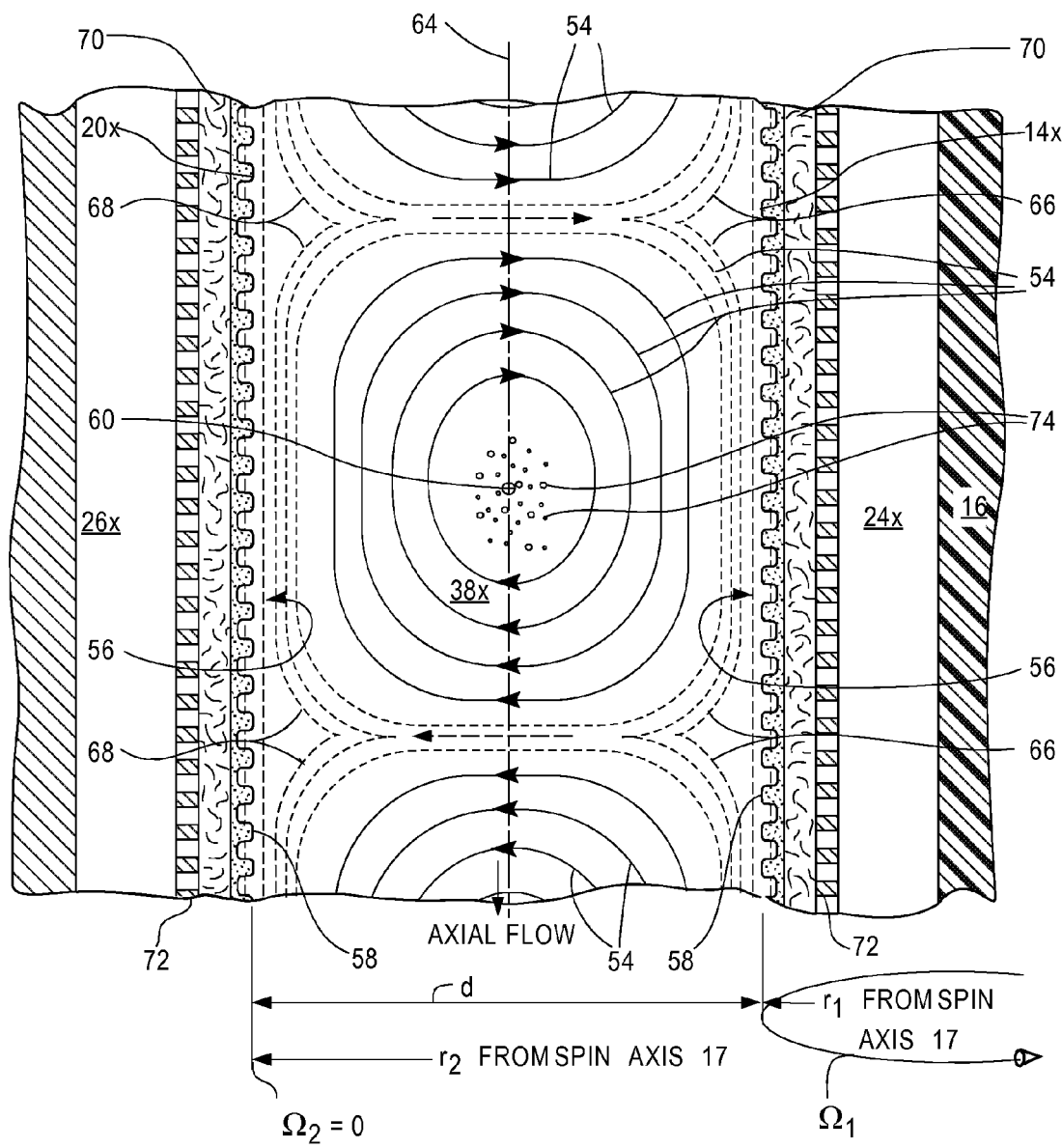

As shown in FIG. 2C, CCF 56 move most rapidly at and with the surface of the rotating electrode 14$x$ and least at the transition to vortex flow 66 a small distance away. In the case of the fixed electrode 20$x$ surface, fluid moves most rapidly at the transition from vortex flow 68 and effectively zero at the fixed electrode 20$x$ surface; again within a small distance.

The high velocities of these boundary layer, laminar CCF 56 and the very small distances over which they occur will produce extremely high shear rates and consequently large mass transport coefficients. The invention takes further advantage of these very desirable CCF 56 by incorporating protuberances 58 of active material that extend from the electrodes 14x and 20x into the high-shear laminar CCF 56 shown in FIG. 2C. The protuberances 58 are further disclosed in Case C and Case D for use with fuel cells. The protuberances 58 greatly increase the amount of electrode 14x, 20x active surface exposed to the high shear flow 56.

Figure 2D:
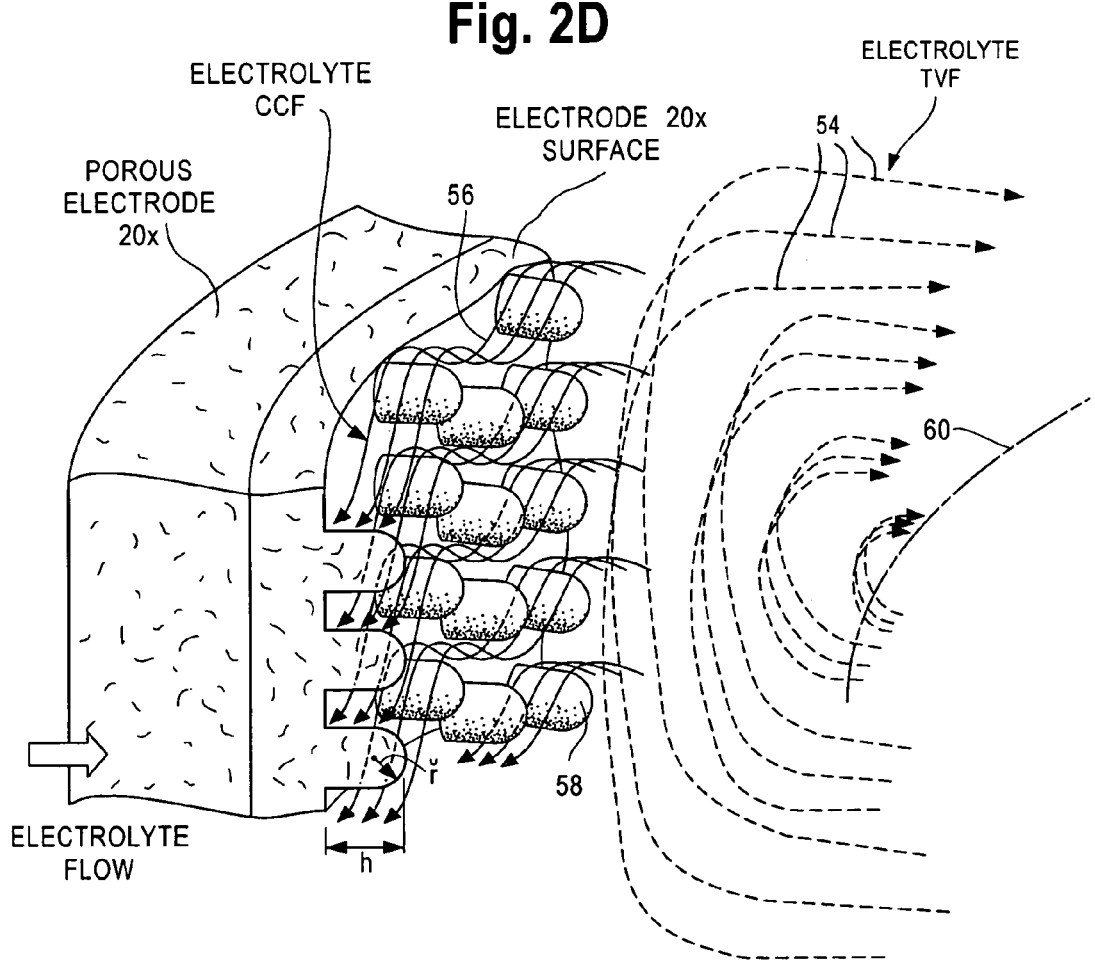

FIG. 2D provides another view of the relationship between the TVF 54 rotating around the TVF axis 60 and the CCF 56 at the surface of concave, porous, fixed electrode 20x. The CCF 56 are orthogonal to the TVF 54 and parallel to the TVF axis 60. The CCF 56 encompass protuberances 58 that extend from the electrode 20x surface into the CCF 56. A similar relationship is formed at the convex, porous, rotating electrode 14x (not shown in FIG. 2D).

Also as shown in FIG. 2C, the electrodes 14x and 20x preferably include electrically conducting isotropic nanoporous chemically active material appropriate to each battery electrode or copper or gold foam nanosponges or nanocarbon filamentary material 70 that serve as a scaffold to be speckled, coated or alloyed with chemically active electrode material firmly attached to open cell interconnecting surfaces of such the electrodes 14x and 20x. The foam sponges or carbon filamentary material 70 are further backed and supported by porous metal grids 72 that also conduct large electrical currents.

An important feature of the TVF is illustrated in FIG. 2C where particles from a precipitate, including water attached to the precipitate and bubbles from either electrode surface layers 14x or 20x introduced into electrolyte chamber 38x are drawn into the centers of TVF 54. These particles and bubbles 74 are sometimes formed during operation of the cells 12x. The particles and bubbles 74 are not in actual solution as part of the electrolyte and are therefore subject to the flow dynamics just described. They will experience high pressure gradients caused by the fluid electrolyte TVF 54. These high gradients appear in both the high-shear laminar CCF 56 and within the vortices 54. The TVF 54 quickly drive the particles and bubbles 74 to the centers of the nearest vortices 54 where they remain trapped.

TVF 54 are individual vortex entities that move in axial flow through the electrolyte chamber 38x. The particles and bubbles 74 trapped within vortices 54 are forced out of the electrolyte chamber 38x along with their host vortex 54. Thus, TVF 54 constitute means for extracting unwanted contaminants 74 from the electrolyte. These unwanted contaminants 74 may include reaction precipitates, water, vapor and any gasses exiting either electrode 14x, 20x; any of which can degrade the electrolyte if allowed to remain within it.

As shown in FIG. 2C, one side of the electrolyte chamber 38x is the cylinder-like (or slightly conical) rotating electrode 14x surface at radial distance, $r_1$ from the spin axis of rotation 17 about which it spins at an angular rate, $\Omega_1$. The other side of the electrolyte chamber 38x is the cylindrical (or slightly conical) fixed electrode 20x surface layer, $r_2$ from cell spin axis of rotation 17, which spins at an angular rate $\Omega_2$. In this embodiment, the electrode 20x surface is fixed and $\Omega_2=0$; however, embodiments where $\Omega_2 \neq 0$ are also practical.

The gap thickness, $d=r_2-r_1>0$ is defined above as the distance between the two surface layers 20x and 14x. As used herein, the term 'gap' is synonymous with the width, d, of the electrolyte chamber 38x.

As derived from Lathrop, Daniel P., et al, "Transition to shear-driven turbulence in Couette-Taylor flow.", Physical Review A, vol: 46, No. 10, (Nov. 15, 1992), pp; 6390-6404, the circumferential Reynolds number, $R_c$, for fluids contained in a gap between a moving member having rotational speed $\Omega_1 > 0$ and a fixed member having speed $\Omega_2=0$ is defined as:

$$R_c = \{\pi(\text{RPM})r_1 d/30\nu\} \leq 10^4 \quad \text{Equation \& Condition (1)}$$

where:

$\Omega_1 = [2\pi(\text{RPM})/60]$ radians/second; and $\nu$=kinematic viscosity=$\mu$(poise)/$\rho$(grams/cc.)

The condition that $R_c \leq 10^4$ is required for well-formed Taylor Vortex Flows so that fluid flow contained within the gap d be non-turbulent. The condition that these vortices exist in a form required by the invention can be written as the following lower limit for the critical Taylor number, $T_c$ at which the characteristic vortices begin to form:

$$T_c = 2r_1(\pi/30)^2 d^3 (\text{RPM})^2/\nu^2 (2+\{d/r_1\}) \geq 1,715 f\{R_a\} \quad \text{Equation \& Condition (2)}$$

where:

$f\{R_a\}$ is a function derived in Chandrasekhar, S., "The hydrodynamic stability of viscid flow between coaxial cylinders", Proc. Nat. Acad. Sci., vol. 46, No. 1, (1960) pp. 141-3 and reported to be experimentally verified in R. J. Donnelly and D. Fultz, "Experiments On The Stability Of Spiral Flow Between Rotating Cylinders", ibid. No. 8, pp; 1150-1154 [see their FIG. 1 on page 1153]; and $R_a$=the axial Reynolds number for Poiseuille-type axial recirculation flow through the gap, d.

A convenient way to express $R_a$ is:

$$R_a = (dL/\nu)(\mathring{U}/U) \quad \text{Equation (3)}$$

where:

L is the axial length of the active porous member(s),

U is the volume of fluid in the gap of thickness, d, $\mathring{U}$ is the volumetric rate of axial flow from one end of the gap to the other, and $\mathring{U}/U$ is the rate of exchange of all the volume in the gap.

A convenient numerical expression for $f\{R_a\}$ is:

$$f\{R_a\} = 1.0 + (0.297)(\log_{10} R_a)^{4.04342} \text{ for } R_a > 1.0$$

$$f\{R_a\} = 1.0 \text{ for } 0 \leq R_a \leq 1.0$$

The two Conditions, (1) and (2), defined above should be met for optimum operation. They do not restrict design parameters to specific values; but rather, permit a fairly broad range of permitted values that can be chosen to satisfy other desirable conditions.

For example, it may be desirable to limit torque driving the spinning member so that it does not consume an appreciable fraction of the power generated. The thickness of the laminar high shear boundary layer on the facing surfaces of each of the porous electrodes 14x, 20x can be chosen for optimal mass transport characteristics. The equations that define these properties are:

Torque, T was defined in Lathrop, Daniel P. et al, "Transition to shear-driven turbulence in Couette-Taylor flow.", Physical Review A, vol. 46, No. 10, (15 Nov. 1992), pp; 6390-6404 as:

$$T = (0.202)\rho \nu^2 L (r_1 R_c/d)^{5/3} \quad \text{Equation (4)}$$

Therefore, the power expended in spinning the inner member per $cm^2$ of surface area is:

$$W = (7.834)\rho \nu^{1/3}(r_1)^{7/3}(\text{RPM})^{8/3} \times 10^{-12} \text{ Watts/cm}^2 \quad \text{Equation (5)}$$

The respective stable boundary layer thicknesses, $\delta_1$ and $\delta_2$ are:

$$\delta_1 = (28.45)(\nu/\text{RPM})^{2/3}(r_1)^{-1/3} \quad \text{Equation (6a)}$$

$$\delta_2 = (1.29)(1+[d/r_1])\delta_1 \quad \text{Equation (6b)}$$

Neither the power expended, W, nor the boundary layer thicknesses, $\delta_1$ nor $\delta_2$, depend on the gap dimension, d, between the two porous surfaces. $\delta_2$ is a function of $r_2$. The nominal shear rate without TVF would be $\omega_1 r_1/d$; but, the shear rate with TVF, for $\Omega_2=0$, is $\Omega_1 r_1/\delta_1$ and $\Omega_1 r_2/\delta_2$ for the two surfaces, respectively.

Thus, shear at each surface is multiplied by factors of:

$$d/\delta_1 = 0.03515(\nu/RPM)^{-2/3}(r_1)^{1/3}d; \text{ and}$$

$$d/\delta_2 = 0.775(d/\delta_1)/(1+d/r_1).$$

If d is small compared to $r_1$, then stable laminar shear at the outer stationary surface is only slightly less than at the spinning one.

Figure 3:
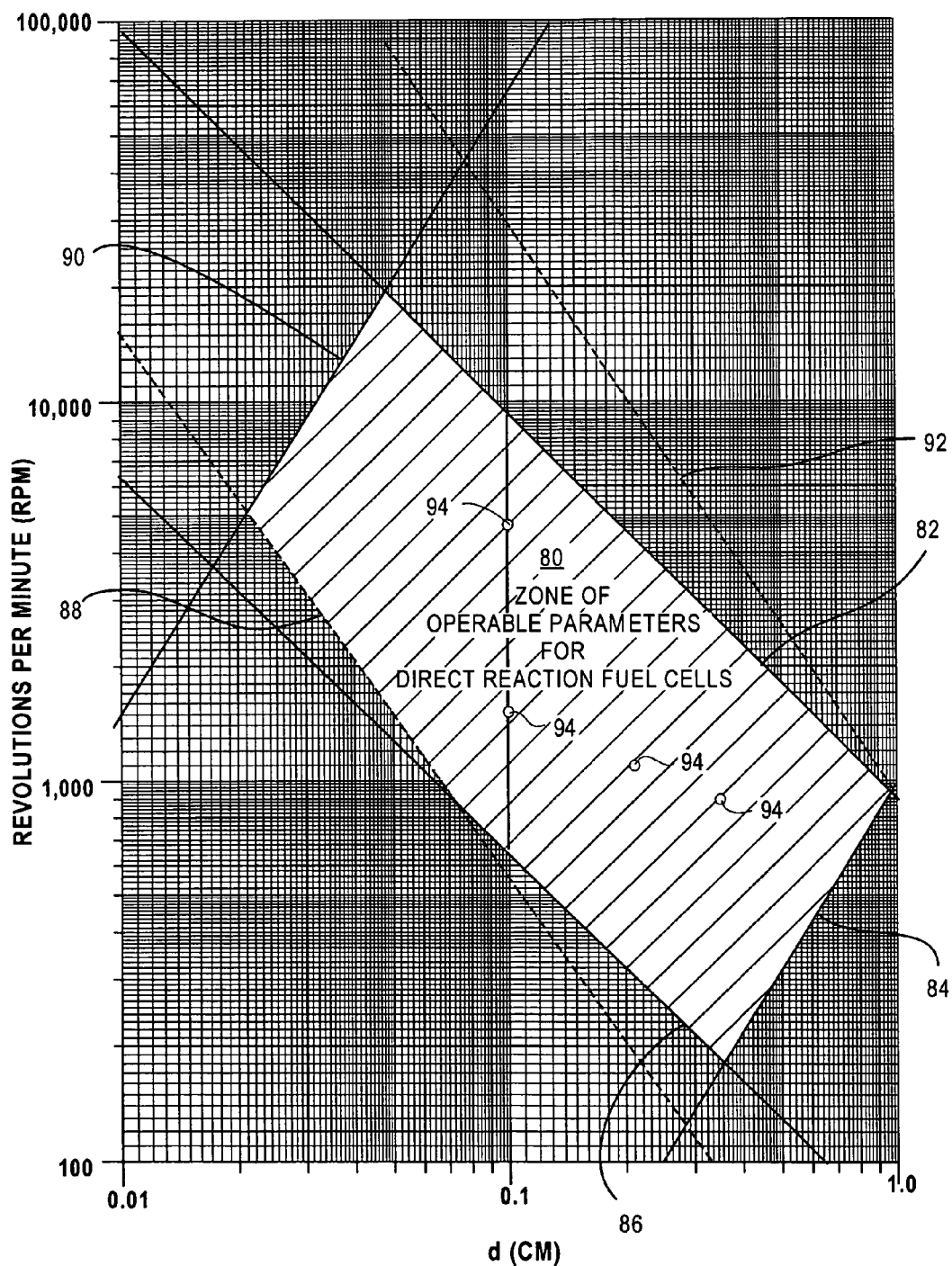
FIG. 3 is a log-log graph of Revolutions Per Minute (RPM) as a function of gap width, d, for a range or zone of operable conditions.

FIG. 3 is a log-log graph of Revolutions Per Minute (RPM) as a function of gap width, d, for various operating conditions. A Zone of Operable Parameters 80 is bounded by the following six conditions for $0.0067 \leq d/r_1 \leq 1.0$ shown as plot lines:

82—$R_c \leq 10^4$ and $r_1 \geq 1$ cm;
84—$R_c \leq 10^4$ and $r_1 \leq 3$ cm (0.05 watt/cm$^2$);
86—$R_c \geq 2000$ and $r_1 \geq 3$ cm;
88—$R_c \geq 2000$ and $r_1 \leq 3$ cm;
90—$R_c \geq 2000$ and $r_1 \geq 3$ cm (0.05 watt/cm$^2$); and
92—$T_c \leq 10^4$ and $r_1 \geq 1$ cm.

Coordinates of typical operating values are shown as circles 94 in the Zone 80. The graph is based on equations presented here for typical values of fluid viscosities and densities of alkaline and acid electrolytes. The purpose of the Zone 80 is to define a range of parameters that will yield TVF and avoid turbulence.

U.S. Pat. No. 5,783,085 awarded for my invention of a Blood Fractionation Method discloses a process for separating plasma from whole blood with TVF. It describes the nature of the vortices and the boundary layer thicknesses $\delta_1$ and $\delta_2$, defined by Equations 6a & 6b, that envelop them and as illustrated in FIG. 2A. FIG. 2B, FIG. 2C and FIG. 2D.

My '085 blood plasma collection machine is used to remove undesirable suspended particulates from a fluid. The machine incorporates an inner spinning membrane filter to pass selectively fluid component to be separated from a particulate suspension without having particulates plug pores in the membrane.

A vortex will act on any particulate discontinuity with a pressure gradient that drives the particle to the low pressure center of the vortex axis. This occurs whether the particle is a buoyant bubble or denser component, such as particles and bubbles 74 of FIG. 2C Ions, on the other hand, are in solution and move hydrodynamically with the fluid or are driven by concentration differences through diffusion accelerated by shear forces. In the case of membrane filtration of suspensions (e.g., hemodialysis filters), some particles will be forced against the membrane into the boundary layer which is often referred to as concentration polarization. Although the liquid component is trying to drag particles into and through the pores of the membrane, the extremely high shear rate, referred to above, creates what amounts to a fluidized bed of relatively, but not totally, compacted particles through which the liquid passes.

The maximum rate of liquid filtration (absent fully compacting the polarization layer that would drive the particles into and through the pores) is a linear function of the boundary layer shear rate. The reason membrane filtration of suspensions is so effective with TVF is due to that amplified boundary layer shear rate.

Ions are carried convectively by TVF from one electrode to the other in the DARB 10 at a prodigious rate that is far greater than could ever be achieved in a solid polymer PEM (e.g., NAFION™) or other stationary electrolyte. Once they have arrived near an electrode (e.g., 14x or 20x) surface, they are subjected to exceptionally energetic shear in laminar CCF 56 covering the electrode which, for most common electrolyte liquids, will be shown to be somewhat thinner than solid membranes or an otherwise stationary electrolyte.

It is shear-enhanced diffusion in the laminar boundary layer that transports ions and reaction products to and from the highly porous electrode surfaces. Because roughly-silo-shaped, finger-like protuberances 58 of chemically reactive porous electrode 14x and 20x surfaces, illustrated in FIG. 2C and FIG. 2D, extend into the laminar CCF 56, ions have both a shorter path to travel and a faster diffusion rate. The diffusion rate increases rapidly as a function of shear stress in a viscous fluid.

As stated earlier, the limiting factor for charge and discharge of the battery 10 is diffusion of anode ions (e.g., Li+) in the electrodes 14x and 20x, which are flooded with electrolyte and the creation and delivery of anode ions (e.g., Li$^+$) and release of electrons to the electrode 14x and 20x surfaces. The CCF 56 expedite these reactions and deliveries and enable the DARB 10 to provide superior charge and discharge rate performance.

Construction of DARB 10 require mathematical analysis of physical design and operable parameters to select useful values that can be applied to a specific design or embodiment. Because electrolytes are liquids, there is a special condition that needs to be imposed, namely, that the power required to spin the rotating electrode 14x not be too great a fraction of the power produced. Applying this condition to typical electrolytes used in DARB 10 and choosing a reasonable range of rotating member diameters (e.g., $r_1$ and $r_2$ of FIG. 2C) will yield an acceptable design and values within a 'Zone of Operable Parameters' 80 of FIG. 3 where RPM is plotted on log-log axes against gap width, d.

Using the stated physical properties, FIG. 3 displays logarithmic plots of Equation 5 for rotational power decrement of 0.05 watt/cm$^2$ used to spin the rotating element (e.g., rotating electrode cylinders 14x of FIG. 1A). This is less than 1% of an expected 5-10 watt/cm$^2$ power density in DARB 10. By comparison, conventional batteries produce only $1/20^{th}$ the power density of DARB or about 0.25-0.5-watt/cm$^2$.

By comparison with DARB 10, a high performance Li-ion battery may be able to store as much as 0.22 kW-h per liter of battery volume based on a reported value of 100 a-h/kg, 4 volts and density of 0.534 gm/cc. But, Li-ion battery's membrane ionic conductivity and static diffusion surface chemistry limit its current density to at most 10 milliamp/cm$^2$ or 0.1 kW/liter and requires approximately 2500 cm$^2$ of Li electrode surface area. The theoretical maximum energy storage of solid Li at 4 volts is close to 8 kw-h/liter. Such a battery has 27.6 cc of Li per liter of battery so electrodes must be at least 100 microns in thickness. Clearly, the Li battery would require 2.2 hours of charging at substantial overvoltage (not recommended for safety and heating concerns in a sealed battery) to obtain a full charge.

Because of a much higher current density for both charge and discharge cycles, DARB 10 reduce recharge time by a factor of 10 or 20 and recirculation venting avoids the explosion hazard. As explained more fully below, these advantages provide greatly increased power density while providing competitive energy storage density.

The 'Zone of Operable Parameters' area 80 of FIG. 3 covers a range of non-turbulent Reynolds numbers, $R_c$, from 2000 to $10^4$ and values of spinner radius (e.g., $r_1$ in FIG. 2C) from about 1 cm to 3 cm. The range of permissible values of gap width, d, in relation to RPM lies between these plot lines 92, 82, 86 and 88. In addition, (Conditions 1 & 2) are shown on the same graph as plot lines 84 and 90. Together, these plot lines form a central 'Zone of Operable Parameters' 80. The 'Zone of Operable Parameters' 80 should be understood to indicate practical; but not necessarily exclusive, system design parametric values within which useful TVF may be obtained without turbulence.

For example, one might want to limit the motor speeds to 1800 or 3600 RPM, which are standard 60 Hz electric motor speeds in North America. The range of suitable values for gap, d, appears in FIG. 3 to be about 0.05 to 0.15 cm; but, a wider gap dimension, $d=r_2-r_1$, facilitates higher critical Taylor number, $T_c$, and consequently higher allowed recirculation rates in accordance with the combined application of Equations 2 & 3.

The plot lines 88 and 92 in FIG. 3 bound minimum critical Taylor numbers, $T_c$, which slightly further limit the operable range of values. The boundary layer thicknesses for typical design parameters such as d=0.1 cm and $r_1$=2 cm. are next calculated.

If there is a reason to construct a miniature device with $r_1 \approx 1$ cm and $d \approx 0.1$ cm, then the criteria for establishing TVF would be met for RPM>1000. To ensure flows will not be turbulent, 1000<RPM<6500. For larger devices where $r_1 \approx 5$ cm and $d \leq 1$ cm, there is no difficulty satisfying the Taylor criterion. To avoid turbulence, the RPM should be <1100.

The following table provides some representative values:

| Motor Speed (RPM) | $R_c$ | $\delta_1$ mm | Shear Multiplier |
|---|---|---|---|
| 1800 | 3770 | 0.071 | 14.12 |
| 3600 | 7540 | 0.045 | 22.40 |

The range of boundary layer thickness values are somewhat less than, but nearly the same as, currently used in PEM solid polymer membranes. A major difference is the rate of shear-amplified diffusion compared to polymer interstitial transport.

Typical CCF 56 laminar boundary layer shear rates for DARB 10 result in a "Shear Multiplier", as shown above, of as much as 15 to over 20-times the nominal value of $r_1\Omega_1/d$ for a conventional battery. The value of $1/\nu$ will be on the order of 100 sec/cm$^2$ and the electrolyte chamber gap, d, will be approximately 0.1 cm. $R_a$ will be roughly 10 times the product of the length of a chamber such as 24 and volumetric exchange rate. If that product is on the order of 10 or 20 (e.g., a meter length can change volume every 5 to 10 seconds, etc.), then it is possible to hold $R_a$ to 200 or less so that a value of $T_c > 10^4$ will be sufficient in nearly all cases to ensure the establishment of effective TVF.

Boundary layer thickness calculations provide an estimate of ionic conductivity through TVF 54 between electrodes. Clearly, the convective mass transport of the vortices themselves is orders of magnitude beyond relevance and will be ignored. For purposes of this calculation, the value of ionic conductivity in siemens/cm is a primary parameter and is understood to equal (amperes/cm$^2$)/(volts/cm).

Actual performance of conventional solid-polymer PEM fuel cell and battery plate stacks provides ionic conductivity values that are typically (0.6)/(0.65/t) where t is the thickness of the polymer membrane. Membrane thickness is described in prior art as $0.005 \leq t \leq 0.01$ cm. Therefore, the ionic conductivity of a PEM in a fuel cell or battery for H$^+$ ions (protons) must be about $4.6 \times 10^{-3}$ to $9.2 \times 10^{-3}$ siemens/cm. Values of ionic conductivity for battery liquid electrolytes at low viscous shear are on the order of 20 to $100 \times 10^{-3}$ siemens/cm. Given the shear stress multiple of the boundary layer as calculated above, it is clear that ionic diffusion driven by concentration gradients and linearly multiplied by shear rate at the electrode surfaces is a further order of magnitude beyond typical battery electrolyte values. For these reasons, ionic conductivity can also be ignored as a limiting factor controlling ionic transport between electrode 14x and 20x surfaces in DARB 10 incorporating TVF 54 and CCF 56.

The boundaries of the Zone 80 also define several limiting conditions. For example, there are no useful designs for gap widths d<0.02 cm or d>1.0 cm or for spin rates $\Omega$<200 RPM or $\Omega$>20,000. Zone 80 displays practical values for a gap width d=0.1 cm. and $1800 \leq RPM \leq 3600$. Larger gaps on the order of $0.2 \leq d \leq 0.3$ cm. will require spin rates $\Omega \approx 1,000$ rpm.

For the normalized parameter, $0.0067 \leq d/r_1 \leq 1.0$, spinner diameters should be in the range of $1 \leq r_1 \leq 6$ cm. Smaller or larger diameters will only have a small effect on the stated ranges and are unlikely to be preferred in most DRFC 10 applications.

The parameters described above for generating TVF 54 and laminar CCF 56 apply to both charging and discharging the DARB 10 in normal operating conditions. However in the case of heavily-used DARB 10 having worn or corroded electrodes 14x, 20x, it is sometimes better to charge while spinning the rotating electrodes 14x at speeds that cause turbulent flows—rather than laminar CCF—at the electrode 14x, 20x surfaces. Turbulence in these circumstances can accelerate re-plating by opening pores and by dislodging precipitates, which will then be drawn to the centers of TVF 54 as particles 76 to be expelled from the electrolyte chamber 38x and removed from the electrolyte by BOP 28.

Dynamic Accelerated Reaction Battery

Second Embodiment

Interdigitated Electrodes

Figure 4:
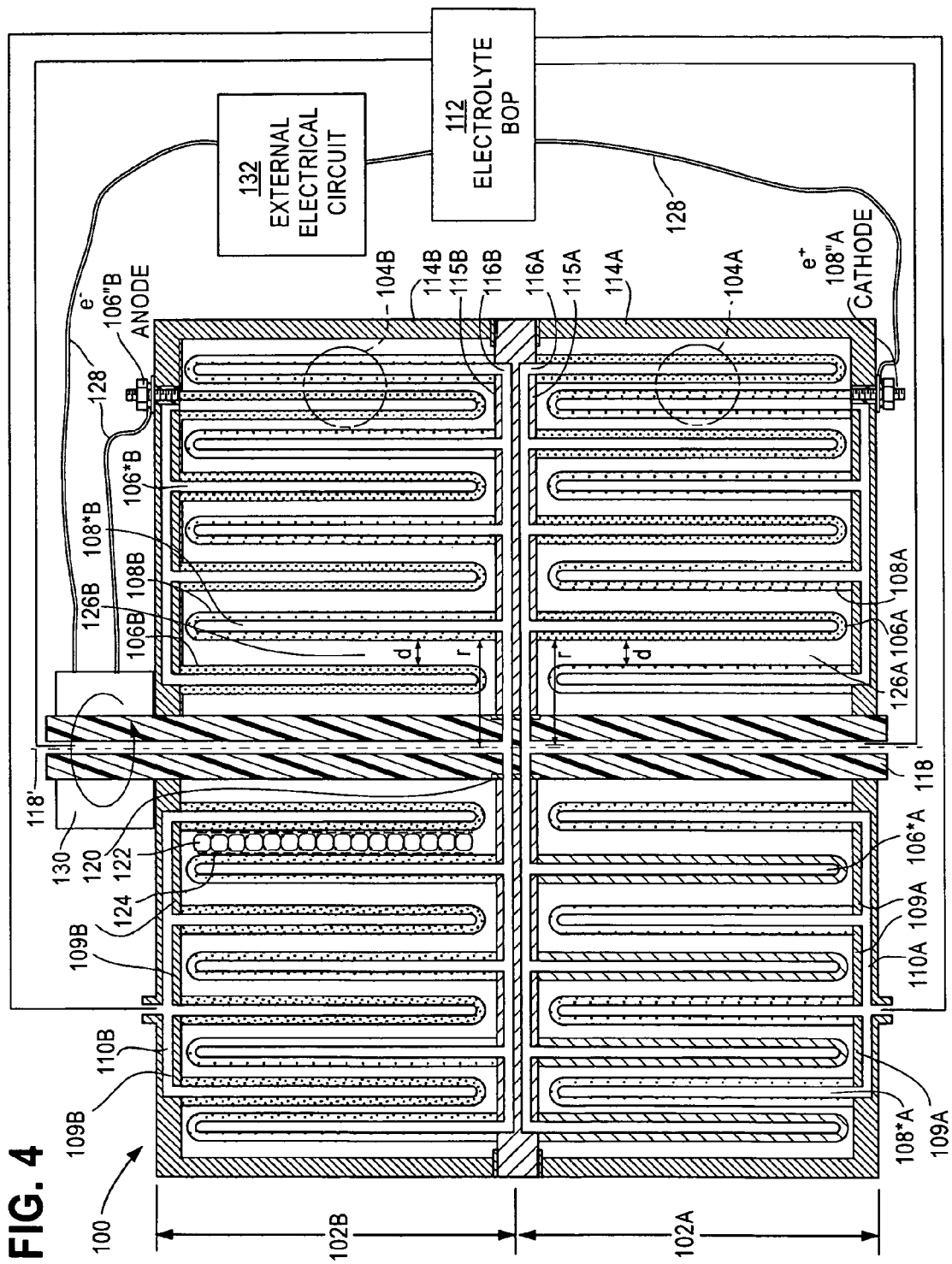
FIG. 4 is a fragmentary cross-sectional view of a second preferred embodiment of a Dynamic Accelerated Reaction Battery comprising interdigitated electrodes.

FIG. 4 is a fragmentary cross-sectional view of a second preferred embodiment of a Dynamic Accelerated Reaction Batteries (DARB) 100. The battery 100 contains two cells 102A and 102B (also identified as 102x, where x=A or B) that are connected in series, as shown for the battery 10 of FIG. 1A.

Each of the cells 102x contains a pair of interdigitated electrodes 104x structured as sets of anode 106x and cathode 108x concentric, cylinder-like electrodes. The electrodes 106x and 108x are interdigitated or nested with each other, as shown in FIG. 4. A primary advantage of interdigitated electrodes 102x is increased energy and power density per cm$^3$ that is achieved by rotating one of the electrodes 106x, 108x relative to the other to generate TVF and CCF—as taught above for DARB 10 of FIG. 1A.

For cell 102A, the cathode electrodes 108A are ∩-shaped and secured to fixed electrode plate 109A, which provides:
  Mechanical support for the cathode electrodes 108A,
  An electrolyte duct 110A for connection to Balance Of Plant (BOP) 112, and
  Electrical conductivity between the electrodes 108A and e$^+$ battery cathode terminal 108"A.

The interiors of the ∩-shaped cathode electrodes 108A are electrolyte manifolds 108*A that are in fluid connection with the electrolyte duct 110A and BOP 112.

In this embodiment, the fixed electrode plate 109A is secured to cell frame 114A and does not rotate. Because the plate 109A is secured to cell frame 114A, there is no need for a collector ring or brush to be in circuit with the battery cathode terminal 108"A.

The anode electrodes 106A are ∪-shaped and secured to rotating electrode plate 115A, which provides:
  Mechanical support for the anode electrodes 106A,
  An electrolyte duct 116A that extends through a rotating shaft 118 for connection to BOP 112, and
  Electrical conductivity between the electrodes 106A and a busbar sleeve 120 on rotating shaft 118.
The interiors of the ∪-shaped anode electrodes are electrolyte manifolds 106*A that are in fluid connection with the electrolyte duct 116A and the BOP 112.

The rotating electrode plate 115A is secured to the rotating shaft 118, which is free to rotate within the cell frame 114A. Thus, the anode electrodes 106A can rotate within the cathode electrodes 108A.

The cell 102B is similar to the cell 102A; but, the cathode electrodes 108B rotate within the fixed anode electrodes 106B. Cell frame 114B is secured to the cell frame 114A so that it cannot rotate.

The cathode electrodes 108B are secured to rotating electrode plate 115B, which provides:
  Mechanical support for the cathode electrodes 108B,
  An electrolyte duct 116B that extends through a rotating shaft 118 for connection to BOP 112, and
  Electrical conductivity between the electrodes 108B and the rotating shaft 118 busbar sleeve 120 that electrically connects the cathode electrodes 108B to the anode electrodes 106A.
The interiors of the ∩-shaped cathode electrodes 108B are electrolyte manifolds 108*B that are in fluid connection with the electrolyte duct 116B and BOP 112.

The rotating electrode plate 115B is secured to the rotating shaft 118, which is free to rotate within the cell frame 114B. Thus, the cathode electrodes 108B can rotate within the anode electrodes 106B.

The anode electrodes 106B are secured to fixed electrode plate 109B that provides:
  Mechanical support for the anode electrodes 106B,
  An electrolyte duct 110B for connection to Balance Of Plant (BOP) 112, and
  Electrical conductivity between the electrodes 106B and e⁻ battery anode terminal 106"B.
The interiors of the ∪-shaped anode electrodes 106B are electrolyte manifolds 106*B that are in fluid connection with the electrolyte duct 110B and BOP 112.

In this embodiment, the fixed electrode plate 109A is secured to cell frame 114B and does not rotate. Because the plate 109B is secured to cell frame 114B, there is no need for a collector ring or brush to be in circuit with the battery anode terminal 106"B.

Since the relative velocity of the rotating electrodes 106A, 108B with respect to their fixed electrodes 106B, 108A increases as their radii r from the rotating shaft spin axis 118' increase, it is necessary to adjust the widths of electrolyte chamber gaps d between the electrodes in order to maintain approximately consistent Taylor numbers needed to generate TVF 122 and CCF 124. As the radii r of each successive pair of anodes 106x and cathodes 108x increases, the electrolyte chamber 126x gap d between interdigitated or nested electrodes 106x, 108x should be decrease by the inverse cube root of the electrode radii 106x, 108x in order to preserve a degree of constancy in the Taylor number or in accordance with operating parameters selected from FIG. 3. Thus, $d \cdot {}^{1}\!/\!{}_{3}\sqrt{r}$=Constant.

In the embodiment of FIG. 4, an electrical series circuit is shown that comprises:
1. Anode e⁻ terminal 106"B,
2. Electrical Conductors 128,
3. Motor 130,
4. External Electric Circuit 132
5. Electrolyte BOP 112, and
6. Cathode e⁺ terminal 108"A.
The series circuit is used so that the motor 130 and the BOP 112 can sense the magnitude of current required by the External Electric Circuit 132 and react with correct responses (e.g., motor speed, electrolyte flow rate); however, other circuit configurations (e.g., parallel. mixed) are practical.

The process for operating the battery 100 is the same as the process for operating DARB 10, described above. Electric motor 130 is energized to rotate the shaft 118 while BOP 112 pumps electrolyte to and from electrode manifolds 106*x and 108*x.

In a battery 100 discharge cycle, the electrolyte flow travels the following path:
  Starting at the Electrolyte BOP 112;
  Then, through electrolyte ducts 116A via rotating shaft 118 and 110*B,
  Then, into anode manifolds 106*A and 106*B,
  Then, through anode electrodes 106A and 106B;
  Then, into electrolyte chamber 126 gaps d;
  Then, through cathode electrodes 108A and 108B;
  Then, into cathode manifolds 108*A and 108*B;
  Then, through electrolyte ducts 110A and 116B via rotating shaft 118; and
  Then, back to electrolyte BOP 112.
In a battery 10 charge cycle, the direction of electrolyte flow is reversed.

Dynamic Accelerated Reaction Battery

Third Embodiment

Membrane with Incompatible Electrolytes

Figure 5:
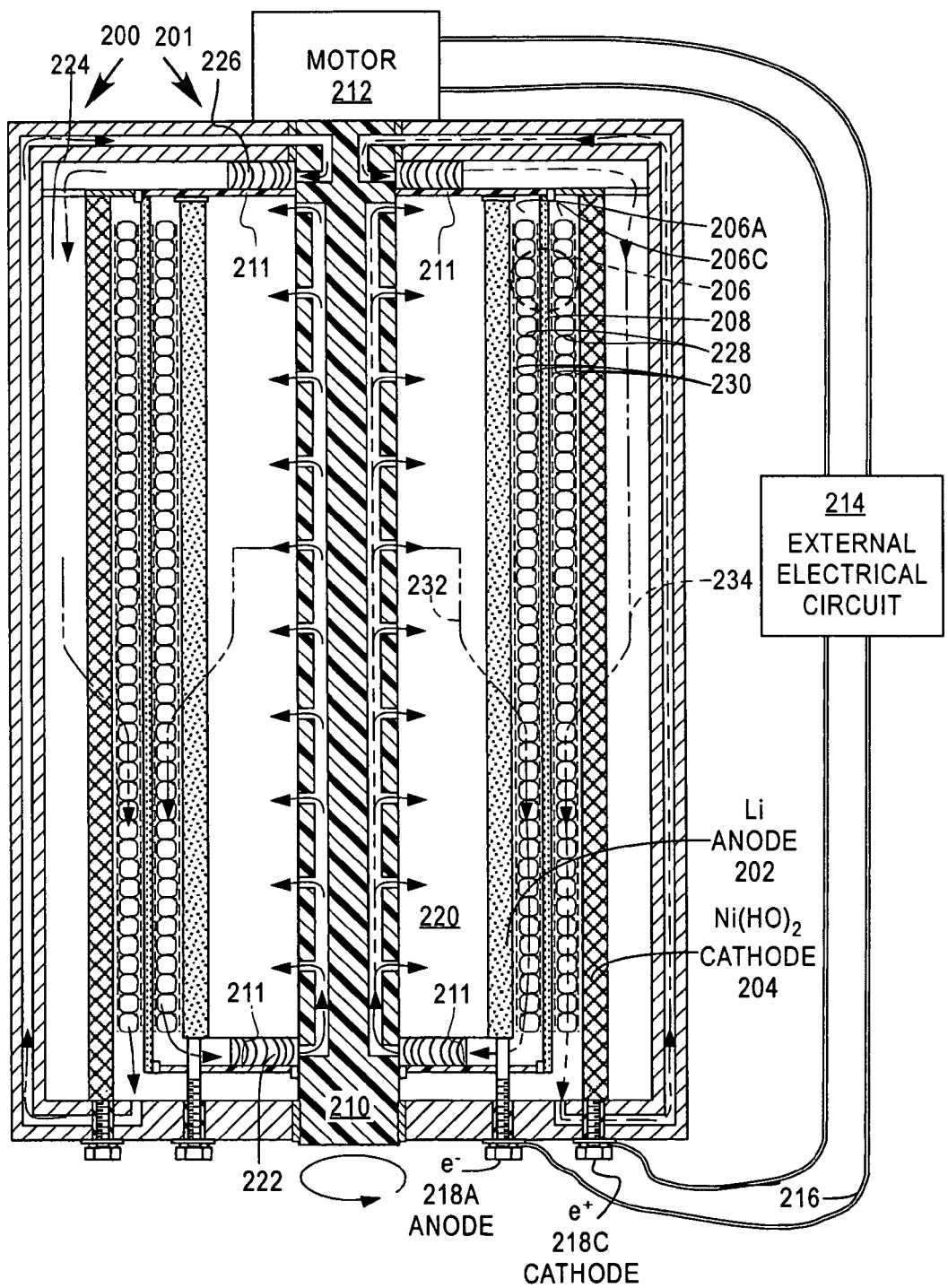
FIG. 5 is a fragmentary cross-sectional view of a third preferred embodiment of a Dynamic Accelerated Reaction Battery for comprising an ion-permeable membrane for use with incompatible electrolytes.

FIG. 5 is a fragmentary cross-sectional view of a third preferred embodiment of a Dynamic Accelerated Reaction Battery 200, which may be used where two incompatible electrolytes (e.g., aqueous and organic) are required—such as in a nickel-lithium battery. Prior art cells and batteries use a membrane to separate the two incompatible electrolytes; however, the membrane permits ions to travel from one electrode to the other. These cells must have increased internal resistance because of low ionic permeability of their membranes. As will be described, cells and batteries of this invention incorporate membranes both to separate incompatible electrolytes and to decrease internal resistance.

DARB 200 comprise a cell 201 containing a lithium metal anode electrode 202 separated from a nickel-hydroxide cathode 204 by an electrolyte chamber 206 divided by an ion-permeable membrane 208. The membrane 208 divides the electrolyte chamber 206 into semi-electrolyte-chamber 206A, adjacent the anode electrode 202, and semi-electrolyte-chamber 206C, adjacent the cathode electrode 204. Examples of suitable membranes are sold under the tradenames NAFION and thio-LISICON.

Because lithium reacts intensely with water to form explosive hydrogen gas and LiOH, the lithium anode 202 requires a non-aqueous electrolyte, which may be an organic liquid that must not be diluted with water. In this embodiment, each of the semi-chambers 206A, 206C contains an electrolyte that is incompatible with the other electrolyte. For example, semi-chamber 206A can contain an organic electrolyte that is compatible with lithium while semi-chamber 206C can contain an aqueous electrolyte that is more suitable for the nickel-hydroxide cathode 204.

The anode 202, the cathode 204, and the ion-permeable membrane 208 are cylinder-like and, in this embodiment, concentric with rotating shaft 210. Motor 212 rotates the shaft 210, which is mechanically coupled by endplates 211 to the membrane 208 so that the membrane 208 can rotate in the electrolyte chamber 206. The anode 202 and the cathode 204 are fixed, so neither requires a collector ring or brushes to connect them to an external electrical circuit 214 via electrical conductors 216 connected to e⁻ anode terminal 218A and e⁺ cathode terminal 218C.

The interior of anode 202 is an anode electrolyte manifold 220 that is in fluid connection with anode electrolyte pump 222, which is attached to the rotating shaft 210. The pump 222 is in fluid connection with the semi-chamber 206A adjacent the anode 202 so that the pump 222 can pump electrolyte between the manifold 220 and the semi-chamber 206A.

The exterior of cathode 204 is a cathode electrolyte manifold 224 that is in fluid connection with cathode electrolyte pump 226, which is attached to the rotating shaft 210. The pump 226 is in fluid connection with the semi-chamber 206C adjacent the cathode 204 so that the pump 226 can pump electrolyte between the manifold 224 and the semi-chamber 206C.

A key feature of the battery 200 is its membrane 208 that rotates between and with respect to both the electrodes 202 and 204 to create TVF 228 and CCF 230 in the semi-chambers 206A and 206C. The shaft 210 and its pumps 222 and 226 are rotated in one direction for charging and the other direction for discharging in order to control the directions of electrolyte flows.

The process for operating DARB 200 is the same as the processes for operating DARB 10 and DARB 100, described above. The electric motor 212 is energized to rotate the shaft 210, which causes the membrane 208 and the pumps 222 and 226 to rotate.

Rotation of the pump 222 during discharge causes organic electrolyte to flow between the manifold 220, through the anode 202 and into the semi-chamber 206A along a path 232 shown by a dashed line with arrows. Rotation of the pump 226 during discharge causes aqueous electrolyte to flow between the manifold 224, through the cathode 204 and into the semi-chamber 206C along a path 234 shown by a dashed line with arrows The speed of rotation for the ion-permeable membrane 208 is chosen to generate the TVF 228 and the CCF 230 in both semi-chamber 206A and semi-chamber 206C. The high-shear-rate, laminar CCF 230 increase electrode surface electrical current density by accelerating mass transport of ions both at the electrodes 202, 204 and at the membrane 208, both of which dramatically lower the internal resistance.

In the a battery 200 discharge cycle, the electrolytes travel the following paths:

For Anode—
Starting at the anode manifold 220;
Then, through the anode 202;
Then, into the semi-chamber 206A where anions penetrate the membrane 208;
Then, into the anode electrolyte pump 222; and
Then, returning into the anode manifold 220,
which follow anode electrolyte flow path 232.

For Cathode—
Starting at the semi-chamber 206C where anions that penetrated the membrane 208 continue to flow toward the cathode 204;
Then, through the cathode 204;
Then, into the cathode electrolyte manifold 224;
Then, into the cathode electrolyte pump 226; and
Then, returning into the semi-chamber 206C,
which follow cathode electrolyte flow path 234.

In a battery 200 charge cycle, the directions of electrolyte flows 232 and 234 are reversed.

The battery 200 shown in FIG. 5 is entirely self-contained as an encapsulated and sealed cell. However, it is practical to add a BOP (not shown), as used for DARB 10 and DARB 100. Also, several cells can be mechanically connected together along the rotating shaft 210 and electrically connected in a series, parallel or combination circuit to obtain desired voltage and current ratings.

Electrodes

Electrodes for Dynamic Accelerated Reaction Batteries share some of the characteristics of electrodes for chemical reactors, fuel cells and fuel reformers described in Case A, Case B, Case C and Case D. The main difference between those electrodes and the battery 10, 100, 200 electrodes is that the former are engineered to promote three-phase reactions (e.g., fuel-electrolyte-catalyst) near and at electrode surfaces while promoting intermediate reaction rates; whereas, electrodes for DARB 10, 100, 200 promote two-phase (e.g., electrolyte-metal) reactions within electrodes. Nevertheless, battery electrode surface structures and conditions are important because high-shear-rate, laminar CCF provide high electrolyte and ion transport rates at electrode and membrane surfaces that accelerate intermediate reactions, lower internal resistance and increase battery energy and power densities.

Catalytic surface layers working together with TVF and CCF form Chemical Process Accelerator Systems that are described in Case C and Case D. Details of Dynamic Accelerated Reaction Battery electrodes with TVF and CCF are described here.

FIG. 6A, FIG. 6B, FIG. 6C and FIG. 6D illustrate DARB 10, 100, 200 electrodes optimized for high liquid/electrode-surface-area contact per unit of projected electrode area and volume of electrode-electrolyte interface in electrode-electrolyte cross-flow and high-shear-rate laminar CCF generated by TVF. These figures illustrate how to provide electrodes that produce accelerated mass transport of ions by virtue of intimate contact with a vigorously flowing electrolyte. Mass transport of ions by diffusion through stagnant liquid in conventional batteries is far slower than the movement of ions to (and product from) the electrodes adapted for use with high-shear-rate laminar fluid flows with high rates of viscous shear.

Figure 6A:
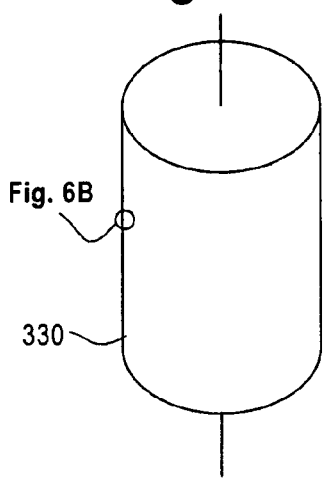
FIG. 6A is a perspective view of an electrode of this invention.
Figure 6B:
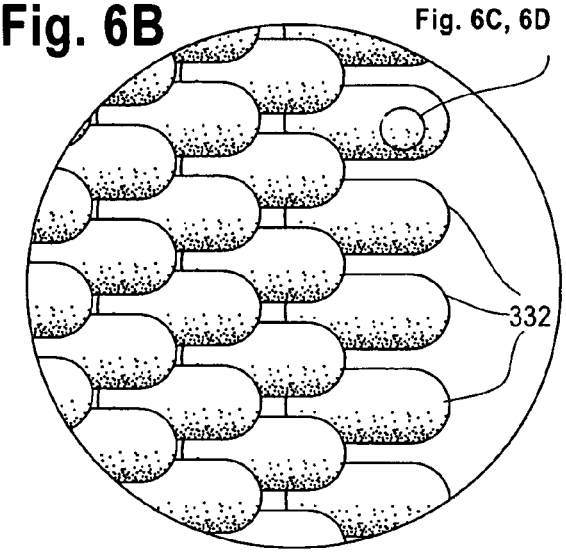
FIG. 6B is a perspective and magnified view of the surface of the electrode of FIG. 6A.

FIG. 6A is a view of a cylindrical electrode surface 330, such as the surfaces of electrodes 14x, 20x, 106x, 108x, 202 or 204. A magnified view of the surface 330 is shown in FIG. 6B, where protuberances 332 are in a hexagonal-close-packed (HCP) array that may be formed by embossing the surface of the cylinder 330. The protuberances 332 have heights of approximately 25 µm and widths (diameters) of about 12 µm are shown extending from the cylinder 330 on a densely covered surface. Those heights are sufficient to reach well into the laminar shear boundary layer 56 of FIG. 2C; but, no higher to avoid damage to the protuberances 332 from high-velocity TVF 54. The protuberances 332 are also shown in FIG. 1B where they extend into high-shear-rate CCF 56.

Figure 6C:
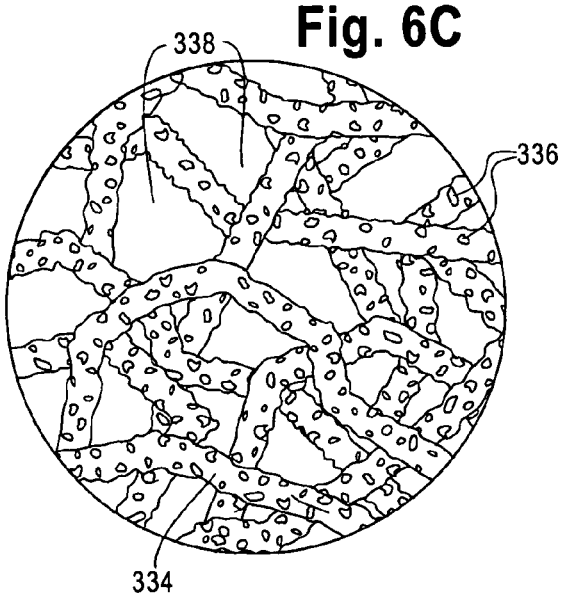
FIG. 6C is a highly-magnified view of one embodiment of the electrode surface of FIG. 6B.

FIG. 6C is a further magnified view of the structures of the electrode 330 and its protuberances 332. As shown in FIG. 6C, the protuberances 332 are formed from a sparse mesh of fine filaments 334 intended to serve as a highly electrically conductive nanoporous, foam-like, support structures for chemically active electrode material, such as metal particles 336. Typical materials for the filaments include copper, gold, nickel or perovskite-structure alloy sponges.

Figure 6D:
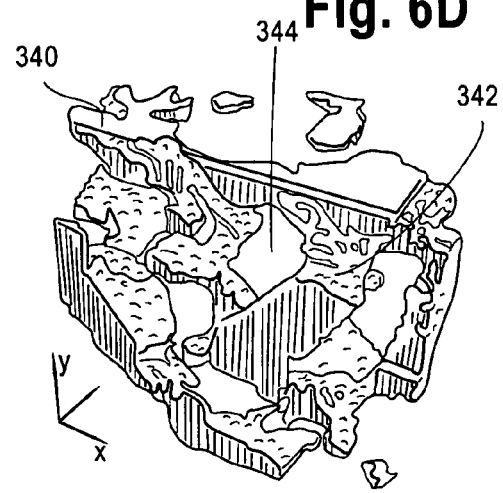
FIG. 6D is a computer-simulated view of another electrode surface.

As used in a NiMH DARB, chemically active maculate deposits or coatings illustrated in FIG. 6C for the negative electrode or anode commonly comprise a rare earth mixture with nickel, cobalt, manganese or aluminum forming a complex intermetallic compound. Other examples and forms of the metal hydride can use titanium or vanadium with zirconium modified with chromium, cobalt or iron. The positive electrode or cathode may contain a basic nickel oxyhydroxide nanoporous foam as illustrated in FIG. 6D.

Another important DARB application is the lithium-ion secondary battery. Lithium metal, lithium-titanium oxide, or lithium in silicon and germanium coatings or intercalated lithium in carbon nanotubes can serve as nanoporous anode material. Cathodes can be chosen from a variety of lithium/metal-oxides or salts in a single compatible organic electrolyte. Neither these batteries nor the NiMH batteries described above require any type of membrane or separator. Nickel oxyhydroxide cathodes of FIG. 6D can be used in lithium batteries with an appropriate rotating membrane in the dual electrolyte of DARB 200, presented above. Alternatively, sulphur cathodes can be used to obtain higher voltage and greater power density. The use of sparse mesh makes the protuberances 332 porous to electrolytes.

Referring to FIG. 6C, there is a successive hierarchy of structures that form the protuberances 332. FIG. 6C, shows a magnification of the protuberances 332 of FIG. 6B that displays mesoporosity. There is sufficient width and breadth to permit moderate interstitial laminar flow of fluid through mesopores 338. In addition, capillary action through the interstices contributes to the amount of electrolyte available for reaction. The degree of interstitial wetting will depend upon electrolyte viscosity and wetting angle, both of which are very high for electrolytes such as phosphoric acid and simple hydroxides.

The diameters (widths, if non-circular) of the protuberances 332 are nominally 12.5 μm. Therefore, there each protuberance 332 will contain approximately 12 to 15 mesopores 338 across its diameter (width).

The protuberances 58, 332 provide an approximate 4-fold increase in electrode/interface area ratio. That, combined with a 250% increase in metal or particle surface 336 loading, contributes to 10-times the metal surface area available to electrode reactions over present practice and an expected 10-fold increase in current performance. The actual operating current increase under load will be less due to ohmic and other losses; but, these losses can be minimized by using thicker materials.

FIG. 6D is a drawing made from a computer-simulated view of an alternative electrode fabricated from nanoporous metal foam sponge or scaffold 340, which is capable of absorbing an electrolyte. The view appeared as FIG. 4 of Pugh et al, "Formation of nanoporous platinum by selective dissolution of Cu from $Cu_{0.75}Pt_{0.25}$", J. Material Research, Vol. 18, No. 1, January 2003, pages 216-221. Coordinate vectors x, y, z are provided as a reference frame. The view covers a volume measuring 14×14×7 nm. Pugh et al used 0.28 nm pixel spacing in calculating their image, which is the atomic radius of a Pt atom. Pugh et al estimated sizes by "taking chord length measurements on the image".

Pugh et al were able to produce isotropic 3-dimensional open-pore-structure foam with 3.4 nm pores and somewhat smaller diameter scaffold struts 342 (called "ligaments" by Pugh et al). They used a process in which one element (e.g., copper) was removed from an alloy (e.g., $Cu_{0.75}Pt_{0.25}$) by selective dissolution (e.g., leeching) to yield a nanoporous metal foam sponge (340) that will absorb electrolyte.

Using the metal alloy face-centered-cubic structural geometry described by Pugh et al and by others (e.g., Erlebacher, J., "An Atomistic Description of Dealloying—Porosity Evolution, the Critical Potential and Rate-Limiting Behavior", J. Electrochemical Society, Vol. 151, No. 10, 2004, pages C614-C626); the approximate relationship of open pore fraction, $\rho_v$ to the chord length, $l_c$ and diameter, D in Pugh et al is given by:

$$(1-\rho_v) = (0.75\pi x^2 + x^3)/(1+x)^3$$

where:
  $x = D/l_c$, and
  $(D+l_c)$ = nominal pore size

The higher power term cannot be ignored when D is a substantial fraction of $l_c$. The stated pore volume fraction is 0.75 based upon a starting Pt alloy concentration of 25% so that the chord diameter would calculate to approximately 2.0 nm for the smallest pore. The $D/l_c$ ratio is 0.58, which is a function of foam sponge geometry and pore volume fraction; but, does not vary for larger pore size results reported by Pugh et al. These dimensions can be increased by varying process parameters, such as de-alloying times, temperatures, applied voltages, solvents and alloy compositions. The metal foam sponge or scaffold 340 is an alternative, but similar, to the sparse metal mesh 334 of FIG. 6C.

The metal foam sponge 340 of FIG. 6D comprises a nanoporous metal scaffold 340 having open and permeable in 3-dimensions pores 344 of 5 to 15 nm contained by the scaffold struts 342, which have smaller dimensions. Metal or metal alloy particles or coatings (not shown), similar to the metal particles 336, may be attached to the scaffold struts 342 in a manner similar to that shown in FIG. 6C. The metal particles 336 are of about 2 to 7 nm in size for best surface area dispersion and surface chemical reaction activity. For DARB 10, 100, 200, lithium, nickel, metal salts, oxides and metals selected from the Transition Metals Group and their alloys are preferred metals for the particles 336 or coatings on the foam sponge scaffold 340. Copper scaffolds are preferred because of their high-current-density electrical conductivity.

Pugh et al described their metal foam pictured in their FIG. 4 as an open pore structure having 3.4 nm or larger pores 344 and comprising comparably sized Pt struts 342. Using x=0.58 and D=2 nm as calculated above, the ratio of exposed chemically active surface area to projected electrode surface area is:

$$[3\pi x/(1+x)^2](T/P_D)$$

where:
  $P_D = (D+l_c)$ = nominal pore 344 diameter,
  T = depth thickness of the electrolyte flow permeating electrode surface layers 14x, 20x, 106x, 108x, 202 or 204, and
  D = diameter of the nanostruts 342 forming the pores 344.

This formula reaches maximum or optimum values for open pore volumes in the range of 50 to 65%. In a 100 micron thick electrode having 75% open pore volume, 3.4 nm pores and 2.0 nm diameter struts 342, the area multiplication factor is 41,000 $cm^2$ of exposed reactive electrode surface area per $cm^2$ of projected electrode.

By comparison, the formula for an equivalent packing volume of spherical particles is $6(1-\rho_v)(T/D)$. Thus, the Pugh et al foam 340 has an exposed surface area comparable to spherical particles 336 with equivalent metal volume loading. While supported particles 336 normally lose about half of their exposed area because of attachment requirements, the porous foam sponge struts 342 are fully exposed to reaction kinetics. Consequently, bare nanoporous foam sponge 340 is at least as effective as a chemically active surface dispersion mechanism as supported particles 336 of equivalent dimension; but, is a more stable structure.

A metal foam sponge 340, even with an open pore volume of 75%, is more effective for the mass transport exposure of metal to TVF and CCF than supported particles 336. Even with pore 344 diameters of 25 nm, the active metal area ratio for a 100 micron thick metal layer is an unprecedented 8,750 cm² to 1 cm² of projected electrode area. It is useful to calculate how much battery volume would be required in state of the art cells containing the same active electrode surface area. Because of these attributes, DARB attributes include low impedance, high current density and fast charge/discharge cycle capacity.

For DARB 10, 100, 200 anodes, the nanoporous metal foam sponges 340 can be produced from an alloy having face-centered cubic geometry with a Miller Index of (1,1,1) and can be loaded with reactive electrode particles 336 or coatings made from a colloidal suspension of the appropriate salts or otherwise deposited as taught in the prior art. The foam sponges 340, containing reactive electrode particles 336, can be heat-treated so that the particles 336 are absorbed into the copper struts 342 to form highly conductive DARB 10, 100, 200 electrode coatings. Alternatively, a 5 to 15 nm metal porous foam sponge 340 can be thermally coated by heat sputtering to the struts 342.

The micro or nano open porosity of the electrodes 14$x$, 20$x$, 106$x$, 108$x$, 202 or 204 provides greatly increased electrode surface areas for the chemical reactions. Forced convection of an incompressible liquid electrolyte will transport ions created by some battery chemistries at one electrode directly into the electrolyte chamber where the ion concentration becomes greatly increased at the electrode-chamber boundaries. TVF will quickly transport those ions to the opposite porous electrode where forced convective flow will cause them to enter the electrode.

Conventional battery electrodes provide 5, to at most, 10 cm² of active electrode area per cm² of projected surface. In available nano porous Ni where:

$\rho_v$=fraction open pore volume, and
$A_r$=active area factor per unit projected area;
it can be shown that if:
$f(\rho_v)$=a function of pore fraction, such that
$A_r=f(\rho_v)(T/P_D)$,
T=the depth thickness of the electrolyte flow permeated electrode, and
$P_D$=the nominal pore diameter that is considered to include both struts and holes;
then, a solution of the following equation for x can be used in an expression for $A_r$ as follows:

$$(1-\rho_v)=(0.75\pi x^2+x^3)/(1+x)^3$$

$$A_r=[3\pi x/(1+x)^2](T/P_D)=f(\rho_v)(T/P_D)$$

Maximum effective surface is obtained at porosities of 50 to 65% open pore fraction. For a 1.0 mm thick electrode with the stated range of open pore volume and 25 nm pores, the area multiplication factor is approximately 92,800 cm² of exposed reactive electrode surface area per cm² of projected electrode.

For rechargeable Ni—Li batteries, the amount of exposed reactive surface area of the cathode material determines the total cell energy capacity in terms of mAh/g. The electrodes in this example have reactive surface areas far greater than those used in conventional batteries and therefore can provide greater discharge and charge rate parameters per unit weight or size than conventional batteries. Further, TVF and CCF enhance transient current changes by accelerating ions to, across and from the membranes.

Dynamic Accelerated Reaction Battery

Fourth Embodiment

Incorporating a Fuel Cell

While DARB are capable of high transient discharge currents, their energy is stored in their electrodes and therefore is limited to the amount of anions that can be plated or removed from their anodes. By contrast, fuel cells, such as those taught in Case A and Case D, derived their energy from continuously replaceable fuels; but, have limited transient current capacity. While combining batteries with fuel cells is taught in the prior art as an aggregation of two distinct technologies, the combination of DARB with Direct Reaction Fuel Cells (DRFC) of Case D or the fuel cells of Case A provides synergies not available in existing products.

One of the most durable batteries ever built was invented by Thomas Edison and claimed in U.S. Pat. No. 852,424. Modern Edison Cells are Ni—Fe alkaline cells that have about five times the energy storage capacity of Pb/acid batteries and last 10 to 20 times longer. Edison cells are built with environmentally "clean" materials and are fully recyclable.

The chief disadvantage of current Edison Cells with their static electrolytes is their very low charge/discharge current. However, Ni—Fe alkaline electrolyte DARB have increased active electrode surface area and accelerated ionic and electrolyte mass transport that surpass the conventional Edison Cell's low current limitations. Because the electrodes do not perceptibly dissolve and need not be re-plated—as required by other battery chemistries, the Ni—Fe batteries endure many discharge-charge cycles of use.

The relevant chemical reactions for the Edison battery are:

Anode

$$Fe+2OH^- \leftrightarrows Fe(OH)_2+2e^-$$

Cathode

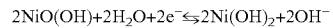
$$2NiO(OH)+2H_2O+2e^- \leftrightarrows 2Ni(OH)_2+2OH^-$$

The Reaction Sum is

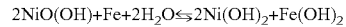
$$2NiO(OH)+Fe+2H_2O \leftrightarrows 2Ni(OH)_2+Fe(OH)_2$$

Cadmium (Cd) can be substituted for Fe in the above chemical equations to obtain equations for NiCd batteries using the same electrolyte. NiCd batteries are popular because they have excellent energy storage capacities and can be made in accordance with this invention. The stability of Cd, Fe and Ni electrode materials and the improved and extremely high surface area to volume ratios, taught above, make these electrodes very desirable for DARB.

One limitation of the FeNi and NiCd DARB, that is disclosed in their chemical equations, is that water is consumed from an ever more alkaline aqueous KOH/LiOH solution. Water—or the lack of it—becomes the limiting factor during discharge. Although the electrolyte is rediluted when charging the batteries, repeated cycles make it difficult to hold the volume of water required to match electrode storage capacity.

In this invention, synergy is achieved by combining water-producing alkaline fuel cells as described in Cases A and D (e.g., DRFC) with water consuming batteries. Water management becomes a simple matter of power balance that can be regulated with microprocessor controllers because the batteries and the fuel cells can use the same electrolyte and common alkalinity. Consequently, it is possible to stoichiometrically match or offset water produced in the fuel cell with water consumed in the battery by circulating the same electrolyte through each device while both are producing electrical power.

These systems circulate electrolyte through small, shared reservoirs in BOP that maintain pH by releasing excess water at a temperature exceeding 100° C. Heat is provided by fuel cell exothermic reactions. When a fuel cell is charging the battery, both the battery and the fuel cell add water to their shared electrolyte. As the battery discharges, water produced by the fuel cell replaces water lost by the battery. The system is self-starting because these batteries are capable of delivering sufficient power in their quiescent mode to energize rotation and circulation. At shutdown, the system uses heat to vaporize excess water that would otherwise freeze in cold weather. The electrolyte is natural antifreeze at proper pH.

Figure 7:
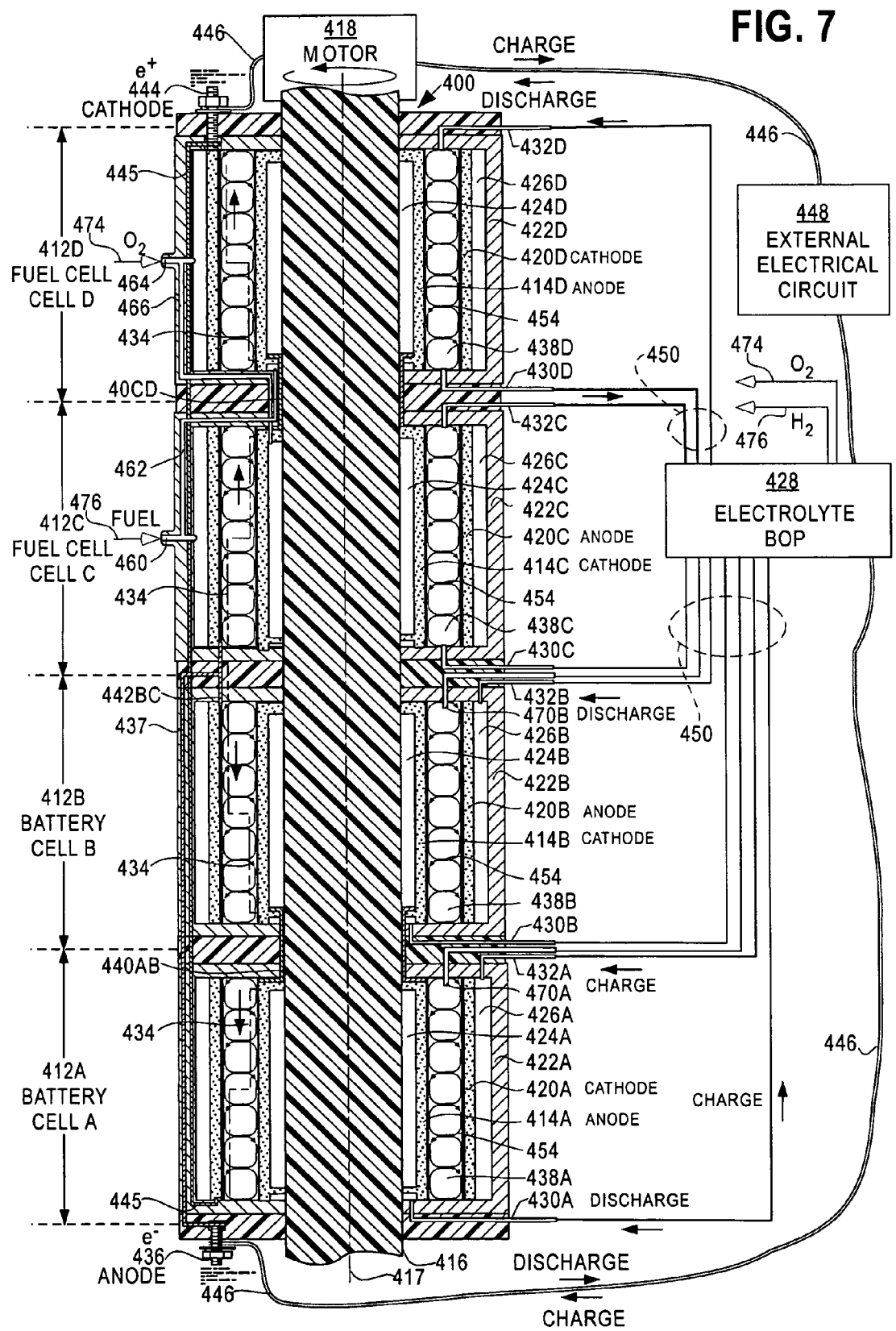
FIG. 7 is a fragmentary cross-sectional view of a Dynamic Accelerated

FIG. 7 is a fragmentary cross-sectional view of a Dynamic Accelerated Reaction Battery 400, as described above, incorporating a Direct Reaction Fuel Cell, as described in Case D. The battery 400 is similar in appearance to the Dynamic Accelerated Reaction Battery 10 of FIG. 1A; however, there are important structural and operational differences.

The battery 400 comprises four cells CELL A-412A, CELL B-412B, CELL C-412C and CELL D-412D. CELL A-412A and CELL B-412B are battery cells. CELL C-412C and CELL D-412D are fuel cell cells.

Each cell contains a rotating electrode 414$x$ where x stands for one of the letters A, B, C or D that is associated with one of the four cells 412$x$. The electrodes 414$x$ are fixed to a shaft 416 that rotates about spin axis 417 and is driven by an electric motor 418. Each cell also contains a fixed electrode 420$x$ that is secured to frame 422$x$. The motor 418 rotates so that so that there is relative motion between one electrode 414$x$, 420$x$ of one polarity and another electrode 420$x$, 414$x$ of another polarity. In this embodiment, the electrode 414A rotates within the electrode 420A, the electrode 414B rotates with the electrode 420B, the electrode 414C rotates with the electrode 420C and the electrode 414D rotates within the electrode 420D. Each frame 422$x$ is mechanically coupled to and electrically insulated from adjacent frame(s) 422$x$.

Cylindrical electrodes 414$x$ and 420$x$ are shown in the drawings as right-circular and coaxial; however, these attributes are not a requirement and other cylinder-like geometries (e.g., elliptical, conical, hyperbolic, irregular, different axes) may be employed. Also, it is practical to build batteries 400 where the inner electrodes 414$x$ are fixed and the outer electrodes 420$x$ rotate or both electrodes 414$x$, 420$x$ rotate at different speeds or directions. All that is required is that one of the cylinder-like electrodes 414$x$ and 420$x$ rotates relative to the other so that there is a relative, rotational velocity difference greater than zero between the cylindrical electrodes 414$x$ and 420$x$.

Rotating electrodes 414A and 414D are anodes. Rotating electrodes 414B and 414C are cathodes. In this embodiment all of the electrodes 414$x$ are fixed to and rotated by the shaft 416, which is common to all for rotating the electrodes 414$x$; however, a common shaft is not a requirement. Fixed electrodes 420A and 420D are cathodes. Fixed electrodes 420B and 420C are anodes. In this embodiment, all of the electrodes 420$x$ are fixed to their frames 422$x$, which are mechanically coupled together; however, that is not a requirement.

The electrodes 414$x$ are rotated by the motor 418 so that there is relative motion between one electrode 414$x$ of one polarity and an adjacent electrode 420$x$ of another polarity. There is also relative motion of the electrodes 414$x$ with respect to the electrolyte in all of the cells 412$x$.

Each of the cells 412$x$ has a rotating electrode manifold 424$x$ and a fixed electrode manifold 426$x$. Each of the battery manifolds 424A, 424B, 426B and 426D is connected to electrolyte Balance of Plant (BOP) 428 through first and second electrolyte ducts 430$x$ and 432$x$. Fuel cell electrolyte chambers 438C and 438D are also connected to the BOP 428 through their first and second electrolyte ducts 430$x$ and 432$x$.

During discharge of battery cells 412A, 412B, electrolyte flows, as shown by arrows, through the battery anode electrodes 414A and 420B, then through electrolyte chambers 438X and back to BOP 428 through battery cathode electrodes 420A and 414B. During charge of battery cells 412A, 412B, the electrolyte flows in the opposite direction. Electrolyte can flow through the fuel cell electrolyte chambers 438C and 438D in either direction.

Operation of the fuel cell cells 412C and 412D is explained in Case A and Case D. The cells 412C and 412D may be powered by $H_2$ as their fuel, as described in Case A; however, Direct Reaction Fuel Cells can be fueled by methane, methanol and sodium borohydride and similar fuels, as described in Case D.

Fuel is introduced into the cells 412C and 412D through fuel port 460, which enters the anode manifold 426C and connects to anode manifold 424D through fuel duct 462. An oxidizer, such as $O_2$, is introduced into the cells 412C and 412D through oxidizer port 464, which enters the cathode manifold 426D and connects to cathode manifold 424C through oxidizer duct 466.

Fuel penetrates the anode electrodes 420C and 414D to reach their surfaces where the fuel participates in a three-phase reaction (fuel-anode catalyst-electrolyte) that yields electrons that provide electrical energy to External Electrical Circuit 448. The reaction also provides protons (H+) that combine with (OH−) ions entering anode electrodes 420C and 414D from the electrolyte chambers 438C and 438D. That reaction yields $H_2O$ that flows through means for sequestering water from the fuel cells 412C and 412D to provide make-up water to the electrolyte in the battery cells 412A and 412B, which include electrolyte chambers 438C and 438D, the electrolyte pipes 450, the electrolyte BOP 428 and electrolyte ducts 430$x$ and 432$x$.

Oxidizer penetrates the cathode electrodes 414C and 420D to reach their surfaces where the oxidizer participates in a three-phase reaction (oxidizer-cathode catalyst-electrolyte) that receives electrons from the External Electrical Circuit 448 which produces (OH−) ions that enter the electrolyte chambers 438C and 438D. These redox reactions are consistent with alkaline electrolyte commonly used in batteries. Acid electrolyte would simply reverse the direction of ($H^+$) ion transfer and water would be produced within cathode electrodes 414C and 420D.

An important battery, widely used by the automobile industry for all-electric cars, is the nickel-metal hydride usually written as NiMH where the M in the negative electrode or anode actually stands for a complex intermetallic compound of a proprietary nature with several manufacturers. The relevant chemical reactions closely parallel those for the Edison cell and take place in relation to the same aqueous solution of KOH:

Anode $$MH + OH^- \leftrightarrows H_2O + M + e^-$$

Cathode $$NiO(OH) + H_2O + e^- \leftrightarrows Ni(OH)_2 + OH^-$$

The Reaction Sum is $$MH + NiO(OH) \leftrightarrows M + Ni(OH)_2$$

In this case it is important to note that the net reaction in either direction potentially does nothing to the electrolyte. Consequent limited electrolyte volume permits sealed, internal closed circuit, repetitive recirculation of the electrolyte through a collective assembly of a bank of cells made in accordance with FIG. 1A or FIG. 4 in the absence of an external BOP. Nevertheless, repetitive charge cycles may cause loss of water from electrolyte, which is common to other battery types. Water replacement as described below with reference to FIG. 7 solves that problem.

The fuel cell cells 412C and 412D are connected in an electrical series circuit. Similarly, the battery cells 412A and 412B are connected in an electrical series circuit. These two circuits are connected in a parallel electrical circuit that will now be described.

The battery 400 electric circuit—illustrated in part as dashed line 434—is then formed that starts at fixed busbar 442BC. The fixed busbar 442BC is connected to the battery anode 420B, the fuel cell anode 420C and external anode (e$^-$) terminal 436 by anode busbar 437.

The battery branch of the parallel circuit follows near the dashed line 434 down through fixed anode electrode 420B, across electrolyte gap 438B, down through rotating cathode electrode 414B, down through rotating copper sleeve busbar 440AB on the rotating shaft 416, down through rotating anode electrode 414A, across electrolyte gap 438A and down through fixed cathode electrode 420A and up to external cathode (e$^+$) terminal 444 by cathode busbar 445.

The fuel cell branch of the parallel circuit follows near the dashed line 434 up through fixed anode electrode 420C, across the electrolyte gap 438C, up through rotating cathode electrode 414C, up through rotating copper sleeve busbar 440CD on the rotating shaft 416 up through rotating anode electrode 414D, across electrolyte gap 438D and up through fixed cathode electrode 420D to the busbar 445 that is connected to external cathode (e$^+$) terminal 444.

The arrows accompanying the electric circuit dashed line 434 show the direction of electricity in the electrodes 414$x$, 420$x$ for discharge. Only ions, not electrons, flow across the electrolyte chambers 438$x$, which may be modeled as voltage sources. The arrows marked DISCHARGE and CHARGE adjacent electrical conductors 446 show the direction of electric current flow for discharging and charging the battery 400. Similarly, the arrows marked DISCHARGE and CHARGE adjacent electrolyte pipes 450 show the direction of electrolyte flow for discharging and charging the battery cells 412A and 412B through the first and second fuel ducts 430A, 430B, 432A and 432B that are connected to the electrolyte chambers 438A and 438B.

As is the case for the DARB 10 shown in FIG. 1A, this novel fuel cell-battery 400 does not contain any collector ring or brush. Thus, there is no need for 1) shaft seals or other mechanisms to protect a collector ring or brush from chemical attack, 2) additional cells or batteries connected in parallel to provide extra current to compensate for a current-limiting collector ring and brush, or 3) additional cell(s) connected in series to provide extra voltage to compensate for contact interface and I$^2$R losses in a collector ring-carbon brush assembly.

The battery 400 is operated by electrically energizing motor 418 to rotate the shaft 416 and energizing Electrolyte BOP 28 to pump electrolyte. As shown for the embodiment of FIG. 7, both the motor 418 and the Electrolyte BOP 428 are in a series circuit containing the battery 400, the electrical conductors 446 and the External Electrical Circuit 448. This circuit will provide feedback so that the speed of motor 418 and the flow rate of electrolyte pumped by BOP 428 will be a function of the magnitude and direction electric current flowing in conductors 446. As will be described below, the BOP 428 also includes means for using exothermic heat energy and water from the fuel cells 412C, 412D to maintain optimum battery cell 412A, 412B temperature and electrolyte pH. Alternatively, either or both the motor 418 and the Electrolyte BOP 428 can be powered from an external source.

As described above for DARB 10, the rotation at a proper speed of the rotating electrodes 414$x$ relative to the fixed or stationary electrodes 420$x$ will cause TVF 454 to form in the electrolyte chambers 438$x$. When the speed of rotation is properly adjusted, then CCF (shown in FIG. 1B, FIG. 2C and FIG. 2D as 56) will form adjacent to the surfaces of both electrodes 20A and 14A. The CCF 56 are high-velocity, high-shear rate laminar flows that provide a dynamic improvement in ionic mass transport within electrolyte and expedite high-speed ion transport between the electrodes 414$x$ and 420$x$ in both the battery cells 412A, 412B and the fuel cell cells 412C, 412D. In this embodiment, both the battery cells 412A, 412B and the fuel cell cells 412C, 412D share means, including the rotating shaft 416 and the motor 418, in common for rotating both battery 412A, 412B electrodes 414A, 420A, 414B, 420B and fuel cell 412C, 412D electrodes 414C, 420C, 414D, 420D to create TVF 454 and CCF 56 in both the battery cell 412A, 412B electrolyte chambers 438A, 438B and the fuel cell 412C, 412D electrolyte chambers 438C, 438D.

An essential feature of DARB combined with TVF fuel cells is heat and water balance. The embodiment just described comprises NiFe or NiCd electrodes and alkaline electrolyte that consume water during discharge. NiMH electrodes also consume water or outgas during recharge. Water loss is replaced by the fuel cell. The feature is also useful for other battery chemistries.

For example, heat and water balance also increase performance of Pb/acid batteries. Those batteries make water that must be removed to prevent dilution of the electrolyte. The fuel cell's exothermic reaction generates energy that can heat the battery's electrolyte to boil off water as the battery's electrolyte becomes more diluted during discharge. When the Pb/acid battery requires replacement of water during the battery's charge cycle, the water can be retrieved from a common reservoir that also receives water produced by the fuel cell.

Therefore irrespective of battery type, a fuel cell can provide water or heat energy through the BOP 428 to retain or dispose of water as needed by the battery in order to maintain optimum pH. The pressure and temperature of the battery can be controlled to keep its electrolyte pH constant. Higher operating temperature and pressure in an incompressible electrolyte at optimum pH increases battery efficiency, energy density and power density.

As shown here, there are several synergies that the battery 400 provides that are not found when aggregating prior art fuel cells and batteries. One benefit of incorporating TVF/

CCF fuel cells in DARB is exceptionally high volumetric energy storage density that is achieved as a consequence of the fuel associated with the fuel cell and the energy density of electrodes of the battery with a reduced electrolyte volume. A second benefit is the fast response of the battery transient power demand while the fuel cells support average current demand. A third benefit is that the fuel cells need only be sized to average load, rather than peak load, and the batteries can be sized to transient load rather than average load, thus achieving a smaller and lighter electrical energy supply. All of these contribute to an electrical energy source that has some of the best characteristics of both batteries and fuel cells.

Battery Charging and Discharging

Aqueous electrolyte battery cells require safe handling of $H_2$ and $O_2$ because they can form an explosive mixture explosion during charging. Because battery cell charging requires the application of a voltage somewhat higher than the natural fully charged open circuit voltage (OCV) of the cell, special provision may be required to prevent or compensate for electrolysis of aqueous electrolyte. Even 'intelligent chargers', which adjust applied voltage in response to battery reaction voltage, may permit charger voltage to exceed the dissociation potential of water. This can cause hydrolysis and release of a hazardous gas mixture.

Under standard conditions (STP), the free energy voltage of water formation in a fuel cell is 1.23 volts. This represents 83% of the energy of formation or enthalpy. About 0.25 volts of overvoltage represents energy that is lost to heat. Therefore, at least 1.5 volts is required to charge a cell and split its water molecules. However, electrolysis at any appreciable rate is no more efficient than the opposite fuel cell reaction and produces a similar overvoltage of approximately 0.5 to 0.6 volt. Consequently, a charging voltage greater than 2.0 to 2.1 volt is likely to release appreciable amounts of hydrogen and oxygen gasses.

During charging, electrode polarity remains unchanged; but, charge current flows in a direction opposite to that of discharge current (e.g, charging electrons flow into the battery's anode rather that out of the anode—as during discharge). Battery terminology is retained here in order to avoid confusion with electrolyzers where the electrodes have opposite labels or polarities.

Normally, charging electrons reduce the battery anode metal-oxide or complex intermetallic compound in order to restore them to their pure metallic or hydride form. As a cell's full charge voltage is approached, charging current should be reduced. If excessive voltage is applied, then extra current can cause hydrolysis in a process similar to an alkaline electrolyzer where electrons combine with water to produce four $OH^-$ ions and two $H_2$ gas molecules within the cell's anode. Conversely, $O_2$ gas is produced within the cell's cathode where four $4OH^-$ ions yield two $H_2O$ molecules. The net reaction not only fails to restore needed water; but, it consumes water to further concentrate alkalinity. The synergistic combination of a battery with a fuel cell, as described above for DARB 400 of FIG. 7, can offset this water loss; but, the discharge of potentially explosive gasses must, nevertheless, be prevented.

The four battery embodiments described above are best charged (or recharged) with a method comprising continuous circulation (or recirculation) of electrolyte by forced convection through the electrodes along a path commencing at the cathode (e.g., 20A, 108A, 204, 420A) then continuing through the cathode into the electrolyte chamber or gap (e.g., 38A, 126A, 206, 438A, d) and then through the anode (e.g., 14A, 106A, 202, 414A). Recirculation may or may not include an electrolyte BOP (e.g., 28, 112, 428).

The fuel cell and battery embodiment 400 of FIG. 7 contains an electrolyte BOP 428 comprising means for cycling $H_2$ and $O_2$ gases produced by the battery cells 412A and 412B into fuel and $O_2$ consumed by the fuel cells 412C and 412D. During battery cell 412A and 412B charging, $O_2$ from the cathodes 420A and 414B enter the adjacent electrolyte chambers 438A and 438B. The oxygen gas forms bubbles that are drawn into the TVF 454A and 454B, where they are trapped—just as particles and bubbles 74 are shown in FIG. 2C.

The TVF 454 in the battery cells 412A and 412B are subjected to axial flow, as previously explained, and exit the electrolyte chambers 438A and 438B through electrolyte chamber ducts 470A and 470B. The electrolyte chamber ducts 470A and 470B are connected by the electrolyte pipes 450 to the electrolyte BOP 428 where the $O_2$ is separated from the electrolyte and fed to the oxidizer port 464 by oxidizer duct 474.

Simultaneously, $H_2$ that is produced at the anodes 414A and 420B during the charge cycle bubbles into the electrolyte flowing into the rotating electrode manifold 424A and the fixed electrode manifold 426B. The electrolyte containing the hydrogen gas is then returned to the BOP 428 though first electrolyte duct 430A and second electrolyte duct 432B, which are both connected to the BOP 428 by the electrolyte pipes 450. The $H_2$ that is separated from the returned electrolyte in the BOP 428 is fed to the fuel port 460 by fuel duct 476.

The synergy of coupling the fuel cell cells 412C, 412D to the battery cells 412A, 412B includes their ability to exchange $H_2$, $O_2$ and $H_2O$ and reduces the need to provide additional supplies of gasses and water. It also provides practical means for transferring heat energy from the fuel cell cells 412C, 412D that are exothermic reactors to the battery cells 412A, 412B and the BOP 428 that are endothermic reactors because the water exhausted by the fuel cell cells is heated. This improves the overall fuel efficiency beyond the level that could be achieved if the fuel cell cells 412C, 412D and the battery cells 412A, 412B operated independently of each other.

Recirculation may not require an electrolyte BOP (e.g, 428). Because gas will not penetrate TVF, $O_2$ gas from the cathode can be trapped in the electrolyte chamber (e.g., 438A, 438B) where it can mix with $H_2$ gas from the anode to form an explosive mixture. One method of preventing this is to provide means for admixing catalyst nanoparticles (e.g., Pt, Pd) with the electrolyte to promote the formation of $H_2O$ molecules. These means can be included in the BOP.

The catalytic particles will remain suspended in the liquid electrolyte and become trapped within the TVF (e.g., 454) where they are most needed to catalyze the production of water from any combustible gasses that are produced during the charge cycle. The particles have little effect during discharge and can readily permeate the electrode pores (338, 344) without clogging them. The amount of catalyst needed is far less than the amount required for a catalytic electrode.

If a battery (10, 100, 200) is constructed independently of a companion fuel cell and its electrolyte is recirculated through a BOP, then the simple expedient of intermittently and momentarily halting TVF generation by slowing or stopping rotation will allow gas to be driven into the BOP (48, 112, 214) where it can be burned off using a hot glow coil. The gas purge frequency depends upon the sophistication of the charging apparatus, which can be optimized to minimize gas production.

CONCLUSION

The Dynamic Acceleration Reaction Batteries taught here use:
High-shear-rate, laminar CCF that are generated by TVF,
Electrodes with high ratios of active surface area to projected surface areas, and
Dynamic circulation of electrolyte directly through highly dispersed porous electrodes
that provide unprecedented high charge and discharge rates, as well as high energy and power densities per $cm^3$ and per gram.

DARB will work with all types of liquid electrolytes—including $Ni(OH)_2$—Li cells that incorporate membranes for separation of incompatible electrolytes. Whereas membranes in prior art cells increase battery internal resistance, membranes 208 in DARB 200 can be operated to reduce internal resistance.

Not only do TVF and CCF dramatically increase mass transport of electrolyte and ions through electrodes; but, they lower electrode overpotentials by reducing or eliminating adverse intermediate reactions either by eliminating a constituent chemical or by accelerating the reaction. Thus, battery energy efficiency is improved.

DARB can be configured as completely sealed systems or for use with BOP. Where BOP is used, electrolyte can be refreshed and reaction products (e.g., precipitates sequestered by TVF) can be removed before they can damage electrodes. This is a very important advantage for increasing battery life when used with cell chemistries that create compounds that are incompatible with electrodes (e.g., $PbSO_4$).

Because CCF provide high shear rates, they can move ions from one electrode to the other in very short times. This feature makes DARB well suited for satisfying high transient current demands.

While DARB can provide very high transient currents, they lack the energy capacity of TVF-CCF fuel cells taught in Case A, Case, B Case C and Case D. By contrast, fuel cells have high energy ratings; but, are slower to respond to high transient current requirements. Because they share similar structural characteristics and complementary operating characteristics, DARB and TVF-CCF fuel cells can be combined to produce unique electric power supplies. For example, they can provide both high energy and high power with high transient discharge rates that can accommodate sudden demands for power for automotive applications.

The terms 'DARB', 'battery' and 'batteries' have been used above to describe battery embodiments containing multiple cells. Those terms will also be used in claims that follow where they are now defined to include electrical energy sources having a single cell or multiple cells, unless otherwise described.

While the present disclosure has been presented above with respect to the described and illustrated embodiments of DARB using TVF and CCF, electrodes with high ratios of active surface area to projected surface areas, and dynamic circulation of electrolyte directly through highly dispersed porous electrodes; it is to be understood that the disclosure is not to be limited to those alternatives and described embodiments.

What is claimed is:

1. A dynamic accelerated reaction battery (10, 100, 200, 400) comprising:
    a. a battery cell (12*x*, 102*x*, 201, 412A, 412B);
    b. electrodes of a first polarity (14*x*, 106*x*, 202, 414*x*) and a second polarity (20*x*, 108*x*, 204, 420*x*) located within the cell (12*x*, 102*x*, 201, 412*x*);
    c. an electrolyte chamber (38*x*, 126*x*, 206, 438*x*) for flowing electrolyte between the cell's electrodes of a first polarity (14*x*, 106*x*, 202, 412*x*) and the cell's electrodes of a second polarity (20*x*, 108*x*, 204, 420*x*);
    d. means (28, 112, 222, 428) for pumping electrolyte through the electrodes (14*x*, 20*x*, 106*x*, 108*x*, 202, 204, 226, 414A, 414B, 420A, 420B); and
    e. means (14*x*, 16, 18, 20*x*, 106*x*, 108*x*, 115, 118, 122, 202, 204, 208, 210, 212, 414*x*, 416, 418, 420*x*) for creating Circular Couette Flows or Taylor Vortex Flows (54, 124, 228, 454) in the electrolyte chamber (38*x*, 126*x*, 206, 438*x*) electrolyte.

2. The battery (10, 100, 200, 400) of claim 1 wherein:
the electrodes (14*x*, 20*x*, 106*x*, 108*x*, 202, 204, 414*x*, 420*x*) are cylinder-like.

3. The battery (10, 100, 200, 400) of claim 2 wherein:
one electrode (14*x*, 106*x*, 202, 414*x*) of one polarity is located within one electrode (20*x*, 108*x*, 204, 420*x*) of another polarity.

4. The battery (10, 100, 400) of claim 2 wherein:
the electrode (14*x*, 106*x*, 414*x*) of one polarity rotates relatively within the electrode (20*x*, 108*x*, 420*x*) of another polarity.

5. The battery (10, 100, 200, 400) of claim 2 wherein:
the electrolyte flows into the electrolyte chamber (38*x*, 126*x*, 206, 438*x*) after flowing through an anode electrode (14*x*, 106*x*, 202, 414*x*) when the cell is in a discharge cycle.

6. The battery (10, 100, 200) of claim 1, comprising in addition:
means (14*x*, 16, 18, 20*x*, 54, 106*x*, 108*x*, 115, 118, 122, 124, 202, 204, 208, 210, 212, 228, 414*x*, 416, 418, 420*x*) for creating Circular Couette Flows (56, 124, 230) in the electrolyte chamber (38*x*, 126*x*, 206, 438*x*) electrolyte.

7. The battery (10, 100, 200) of claim 1, comprising in addition:
means (16, 18, 118, 122, 208, 210, 212, 416, 418) for providing relative motion between an electrode (14*x*, 20*x*, 106*x*, 108*x*, 202, 204, 414*x*, 420*x*) and the electrolyte chamber (38*x*, 126*x*, 206, 438*x*) electrolyte.

8. The battery (10, 100, 400) of claim 1, comprising in addition:
means (16, 18, 118, 416, 418) for providing relative motion between one electrode of one polarity (14*x*, 106*x*, 414*x*) separated from another electrode of another polarity (20*x*, 108*x*, 420*x*) by the electrolyte chamber (38*x*, 126*x*, 206, 438*x*).

9. The battery (10, 100, 400) of claim 8 wherein:
    a. each of the electrodes (14*x*, 20*x*, 106*x*, 108*x*, 414*x*, 420*x*) is cylinder-like; and
    b. an electrode (14*x*, 106*x*, 414*x*) of one polarity rotates within an electrode (20*x*, 108*x*, 420*x*) of another polarity.

10. The battery (10, 100, 400) of claim 1, comprise in addition:
    a. a second cell (12B, 102B, 412B) containing an electrode (20B, 108B, 420B) of one polarity separated by an electrolyte chamber (38B, 126B, 438B) from another electrode (14B, 106B, 414B) of another polarity; and
    b. means (40*xx*, 42*xx*, 120, 440*xx*, 442*xx*) for electrically connecting one of the electrodes (14A, 20B, 414A) in the first cell (12*x*, 102*x*, 412*x*) to one of the electrodes (14B, 20A, 414B) that is of the opposite polarity in the second cell (12B, 102B, 412B).

11. The battery (10, 100, 400) of claim 10 comprising in addition:
means (16, 18, 118, 130, 416, 418) for spinning a first electrode (14*x*, 106*x*, 414*x*) of the first cell (12A, 106A, 412A) within another electrode (20A, 108A, 420A) of the first cell (12A, 102A, 412A) and spinning an electrode (14B, 20B, 414B) of the opposite polarity to that of the first electrode (14x, 106x, 414x) of the first cell (12A, 102A, 412A) within and relative to another electrode (20B) of the second cell (12B).

12. The battery (10, 100, 400) of claim 11 wherein:
the electrolyte flows into the electrolyte chamber (38B, 126B, 438B) after flowing through an anode electrode (20B, 108B, 420B) when the cell is in a discharge cycle.

13. The battery (100) of claim 11, wherein its electrodes (106x, 108x) are:
interdigitated, one electrode (106x) within the other (108x).

14. The battery (100) of claim 13, wherein its electrodes (106x, 108x) are:
cylinder-like.

15. The battery (100) of claim 13, wherein:
one interdigitated, electrode (106x) rotates within the other interdigitated electrode (108x).

16. The battery (100) of claim 15, wherein:
the interdigitated electrodes (106x, 108x) are separated by an electrolyte chamber (126x).

17. The battery (10) of claim 16 wherein:
the electrolyte flows into the electrolyte chamber (126x,) after flowing through an anode electrode (106x, 108x) when the cell is in a discharge cycle.

18. The battery (100) of claim 16, comprising:
a. a first cell (102A) containing an electrode (106A) of a first polarity that is interdigitated with an electrode (108A) of a second polarity;
b. a second cell (102B) containing an electrode (106B) of a first polarity that is interdigitated with an electrode (108B) of a second polarity; and
c. means (120) for electrically connecting one electrode (106A, 108A) having one polarity in the first cell (102A) to one electrode (106B, 108B) of another polarity in the second cell (102B).

19. The battery (200) of claim 1, comprising in addition:
a. a membrane (208) dividing the electrolyte chamber (206) into a first semi-electrolyte-chamber (206A) adjacent the first electrode (202) and a second semi-electrolyte-chamber (206C) adjacent the second electrode (204); and
b. means (202, 204, 210, 212) for providing relative motion between the membrane (208) and the electrodes (202, 204).

20. The battery (200) of claim 19 wherein:
a. the first electrode (202) is an anode; and
b. electrolyte flows through the anode (202) into the semi-electrolyte chamber (206A) adjacent the anode (202) when the cell is in a discharge cycle.

21. The battery (200) of claim 19 wherein the electrode of a first polarity is an anode (202) and comprising in addition:
a. means (214) for discharging the cell (201); and
b. means (220, 222) for pumping electrolyte through the anode electrode (202) during the cell (201) discharge cycle.

22. The battery (400) of claim 1 comprising in addition:
a. a fuel cell (412C);
b. electrodes of a first polarity (420C) and a second polarity (414C) located with the fuel cell (412C);
c. an electrolyte chamber (438C) for flowing electrolyte between the fuel cell's electrodes of a first polarity (420C) and the fuel cell's electrodes of a second polarity (412C);

d. means (428) for pumping electrolyte through the electrolyte chamber (438C);
e. means (414C, 416, 418, 420C) for creating Circular Couette Flows or Taylor Vortex Flows (454) in the electrolyte chamber (438x) electrolyte; and
f. means (442BC) for electrically connecting a battery cell (412B) electrode of one polarity (420B) to a fuel cell (412C) electrode of the same polarity (420C).

23. The battery (400) of claim 22 comprising in addition:
means (445) for electrically connecting another battery cell (412A) electrode of another polarity (420A) to another fuel cell (412D) electrode of the same polarity (420D).

24. The battery (400) of claim 22 comprising in addition:
a Balance Of Plant (428) that includes means for using exothermic heat energy and water from the fuel cells (412C, 412D) to maintain optimum battery cell (412A, 412B) temperature.

25. The battery (400) of claim 22 comprising in addition:
a Balance Of Plant (428) that includes means for using exothermic heat energy from the fuel cells (412C, 412D) to maintain optimum battery cell (412A, 412B) electrolyte pH.

26. The battery (400) of claim 22 comprising in addition:
a Balance Of Plant (428) that includes means for using water from the fuel cells (412C, 412D) to maintain optimum battery cell (412A, 412B) electrolyte pH.

27. The battery (400) of claim 22 comprising in addition:
means (438C, 450, 428, 430C, 432C) for sequestering water from the fuel cell (412C) to provide make-up water to the electrolyte in the battery cell (412A).

28. The battery (400) of claim 22 comprising in addition:
means (414C, 416, 418, 420C) for creating Circular Couette Flows (56) in the electrolyte chamber (438x) electrolyte.

29. The battery (400) of claim 22 comprising in addition:
means for rotating one of the battery (412A, 412B) electrodes (414A, 420A, 414B, 420B) and one of the fuel cell (412C, 412D) electrodes (414C, 420C, 414D, 420D) to create TVF (454) and CCF (56) in both the battery cell (412A, 412B) electrolyte chamber (438A, 438B) and the fuel cell (412C, 412D) electrolyte chamber (438C, 438D).

30. The battery (400) of claim 22 comprising in addition:
means (438x, 470A, 470B, 450, 428, 474, 476, 460, 464) for cycling $H_2$ and $O_2$ gases produced by the battery cell (412A, 412B) into fuel and $O_2$ consumed by the fuel cell (412C, 412D).

31. The battery (10, 100, 200) of claim 1 wherein one of the electrodes (12x, 14x, 106x, 108x, 202, 204) comprises:
an isotropic 3-dimensional open-pore-structure foam sponge (340) with nanometer-diameter pores (344) and smaller diameter scaffold struts (342) made by a process in which one metal element was removed from an alloy of that metal by selective dissolution to yield the nanoporous metal foam sponge (340) that will absorb electrolyte.

32. The battery (10, 100, 200) of claim 31 comprising in addition:
a. means (14x, 16, 18, 20x, 54, 106x, 108x, 115, 118, 122, 124, 202, 204, 208, 210, 212, 228) for creating laminar Circular Couette Flows or Taylor Vortex Flows (56, 124, 230) in the electrolyte chamber (38x, 126x, 206) electrolyte; and
b. protuberances (58) extending from one of the electrodes (12x, 14x, 106x, 108x, 202, 204) into the laminar Circular Couette Flows or Taylor Vortex Flows (56, 124, 230) in the electrolyte chamber (38x, 126x, 206) electrolyte.

33. The battery (10, 100, 200) of claim 31 wherein the nanoporous metal foam sponges (340) comprise:
   an alloy having face-centered cubic geometry with a Miller Index of (111).

34. The battery (10, 100, 200) of claim 31 wherein the nanoporous metal foam sponges (340) comprise:
   an alloy having a perovskite structure.

35. The battery (10, 100, 200, 400) of claim 1 comprising in addition:
   means for admixing catalyst nanoparticles with the electrolyte to promote the formation of $H_2O$ molecules from $O_2$ and $H_2$ gas in the electrolyte.

36. The battery (10, 100) of claim 1 in which the means (14x, 16, 18, 20x, 106x, 108x, 115, 118, 122) for creating Circular Couette Flows or Taylor Vortex Flows (54, 124) includes a first cylinder-like electrode (14x, 106x) enclosing a second cylinder-like electrode (20x, 108x) separated from the first by an electrolyte chamber (38x, 126x) of gap distance d and length L and means for rotating one electrode surface with respect to the other at Ω radians per second, further comprising:
   a. means (28, 112) for pumping electrolyte into and out of the chamber (38x, 126x, 206) at a total volumetric exchange rate of ů/U where U is the volume of electrolyte in the chamber and ů is the volumetric rate of flow into and out of the chamber; and
   b. means for regulating the volumetric exchange rate of axial flow and Taylor Number $T_c$ of vortex flow (54, 128) in the electrolyte so that—
      i. $T_c = 2r_2 \Omega^2 d^3/\nu^2 (1+\{r_1/r_2\}) > 1{,}715(f\{R_a\})$, and;
      ii. $R_c = \{\Omega r_1 d/\nu\} \leq 10^4$
      where:
         1. $f\{R_a\} = 1.0 + (0.297)(\log_{10} R_a)^{4.04342}$ for $R_a \geq 1.0$
            $f\{R_a\} = 1.0$ for $0 \leq R_a \leq 1.0$,
         2. $r_1$ = radius of the electrode of the first polarity (14x, 106x),
         3. $r_2$ = radius of the electrode of the second polarity (20x, 108x),
         4. $d = r_1 - r_2$,
         5. $\nu$ = kinematic viscosity of electrolyte = $\mu$(poise)/$\rho$ (grams/cc.),
         6. $R_a = (dL/\nu)(\mathring{u}/U)$, and
         7. $\mathring{u}/U \geq 0$.

37. The battery (10, 100) of claim 36 wherein:
   a. RPM = 30Ω/π, and
   b. coordinates of d and RPM are within a Zone of Operable Parameters (80).

38. A dynamic accelerated reaction battery (100) comprising:
   a. first and second battery cells (102x) wherein each cell contains;
      i. electrodes of a first. polarity (106x) and a second polarity (108x) that are interdigitated (104x), one electrode (106x) within the other (108x);
      ii. an electrolyte chamber (126x) for flowing electrolyte between the electrodes of the first polarity (106x) and the electrodes of the second polarity (108x);
   b. means (120) for electrically connecting one of the electrodes (106A) in the first cell (102A) to one of the electrodes (106B) that is of the opposite polarity in the second cell (102B);
   c. means (130) for spinning a first electrode (106A) of the first cell (102A) within another electrode (108A) of the first cell (102A) and spinning an electrode (108B) of the opposite polarity to that of the first electrode (106A) of the first cell (102A) within and relative to another electrode (106B) of the second cell (102B):
   d. means (112) for pumping electrolyte through the electrodes (106x, 108x); and
   e. means (106x, 108x, 118, 122, 130) for creating Taylor Vortex Flows (122) in the electrolyte chambers (126x) electrolyte.

39. The battery (100) of claim 38, wherein its electrodes (106x, 108x) are:
   cylinder-like.

40. The battery (100) of claim 39, wherein:
   one interdigitated, electrode (106x) rotates within the other interdigitated electrode (108x).

41. The battery (100) of claim 40, wherein:
   the interdigitated electrodes (106x, 108x) are separated by an electrolyte chamber (126x).

42. The battery (10) of claim 41 wherein:
   the electrolyte flows into the electrolyte chamber (126x,) after flowing through an anode electrode (106x, 108x) when the cell is in a discharge cycle.

43. The battery (100) of claim 42, comprising:
   a. a first cell (102A) containing an electrode (106A) of a first polarity that is interdigitated with an electrode (108A) of a second polarity:
   b. a second cell (102B) containing an electrode (106B) of a first polarity that is interdigitated with an electrode (108B) of a second polarity; and
   c. means (120) for electrically connecting one electrode (106A, 108A) having one polarity in the first cell (102A) to one electrode (106B, 108B) of another polarity in the second cell (102B).

44. A dynamic accelerated reaction battery (400) comprising:
   a. a battery cell (412A, B);
   b. electrodes of a first polarity (414x) and a second polarity (420x) located with the battery cell (412A, B);
   c. a battery electrolyte chamber (438A,B) for flowing electrolyte between the battery cell's electrodes of a first polarity (414A,B) and the battery cell's electrodes of a second polarity (420A,B);
   d. means (428) for pumping electrolyte through the electrodes (414A, B, 420A,B);
   e. means (414x, 416, 418, 420x) for creating Taylor Vortex Flows (454) in the battery electrolyte chamber (438A,B) electrolyte:
   f. a fuel cell (412C);
   g. fuel cell electrodes of a first polarity (420C,D) and a second polarity (414C,D) located with the fuel cell (412C,D);
   h. a fuel cell electrolyte chamber (438C,D) for flowing electrolyte between the fuel cell's electrodes of a first polarity (420C, D) and the fuel cell's electrodes of a second polarity (414C,D);
   i. means (428) for pumping electrolyte through the fuel cell electrolyte chamber (438C,D);
   j. means (414C, 416, 418, 420C) for creating Taylor Vortex Flows (454) in the fuel cell electrolyte chamber (438C, D) electrolyte; and
   k. means (442BC) for electrically connecting a battery cell (412B) electrode of one polarity (420B) to a fuel cell (414C) electrode of the same polarity (420C); and
   l. means for rotating one of the battery (412A,B) electrodes (414A, 420A, 414B, 420B) and one of the fuel cell (412C, 412D) electrodes (414C, 420C, 4141D, 420D) to create Taylor Vortex Flows (454) and Circular Couette Flows (56) in both the battery cell (412A,B) electrolyte chamber (438A,B) and the fuel cell (412C,D) electrolyte chamber (438C,D).

45. A dynamic accelerated reaction battery (10, 100, 200, 400) comprising:
 a. a battery cell (12*x*, 102*x*, 201, 412*x*);
 b. electrodes, within the cell (12*x*, 102*x*, 201, 412*x*), of a first polarity (14*x*, 106*x*, 202, 414*x*) and a second polarity (20*x*, 108*x*, 204, 420*x*) having opposing cylinder-like surfaces and arranged so that there can be relative rotation between the electrodes;
 c. an electrolyte chamber (38*x*, 126*x*, 206, 438*x*) for flowing electrolyte between the opposing cylinder-like electrode surfaces and having a gap of width (d);
 d. means (28, 112, 222, .428) for pumping electrolyte through the electrodes (14*x*, 20*x*, 106*x*, 108*x*, 202, 204, 226, 414A, 414B, 420A, 420B); and
 e. means (18) for causing the relative rotation between the electrodes (14*x*, 20*x*, 106*x*, 108*x*, 202, 204, 226, 414A, 414B, 420A, 420B) to be at a rate in relation to the gap width (d) that can create Taylor Vortex Flows (54, 122, 228, 454) in the electrolyte chamber (38*x*, 126*x*, 206, 438*x*) gap.

\* \* \* \* \*

UNITED STATES PATENT AND TRADEMARK OFFICE
CERTIFICATE OF CORRECTION

PATENT NO. : 7,964,301 B2  Page 1 of 1
APPLICATION NO. : 12/800709
DATED : June 21, 2011
INVENTOR(S) : Halbert Fischel et al.

It is certified that error appears in the above-identified patent and that said Letters Patent is hereby corrected as shown below:

Page 1, Col. 2, OTHER PUBLICATIONS, title of Bagotsky citation is
--Fundamentals of Electrochemistry--.
Page 2, Col. 1, OTHER PUBLICATIONS, title of Bagotsky citation is
--Fundamentals of Electrochemistry--.
Col. 10, 1. 11, replace the equation with:

$$T_c = 2\, r_1 (\pi/30)^2 d^3 (RPM)^2 / v^2 (2 + \{d/r_1\}) \geq 1{,}715 (f\{R_a\}) \qquad \text{Equation \& Condition (2)}$$

Claim 1 at Col. 30, line 10, delete "Circular Couette Flows or".
Claim 22 at Col. 30, lines 3-4, delete "Circular Couette Flows or".
Claim 32 at Col. 32, line 61 and line 66 (2 instances), delete "or Taylor Vortex Flows".
Claim 36 at Col. 33, line 15, delete "Circular Couette Flows or".

Signed and Sealed this
Ninth Day of August, 2011

David J. Kappos
*Director of the United States Patent and Trademark Office*